United States Patent [19]
Polster

[11] Patent Number: 6,113,961
[45] Date of Patent: Sep. 5, 2000

[54] APPARATUS AND METHODS FOR PASTEURIZING IN-SHELL EGGS

[76] Inventor: Louis S. Polster, 2205 Marthas Rd., Alexandria, Va. 22307

[21] Appl. No.: 09/002,244

[22] Filed: Dec. 31, 1997

[51] Int. Cl.[7] ............................. A23B 5/00; A23B 4/12; A47F 3/14
[52] U.S. Cl. .................. 426/298; 426/300; 426/614; 426/521; 211/126.1; 211/126.3; 211/126.7; 99/516; 99/473
[58] Field of Search .................................. 426/614, 521, 426/300, 298; 211/126.1, 126.3, 126.7; 99/516, 473

[56] References Cited

U.S. PATENT DOCUMENTS

| | | |
|---|---|---|
| 212,007 | 2/1879 | Inglis et al. . |
| 709,583 | 9/1902 | Schöning . |
| 1,092,897 | 4/1914 | Clairemont . |
| 1,163,873 | 12/1915 | Thornburgh . |
| 1,197,707 | 9/1916 | Bennett . |
| 1,261,724 | 4/1918 | Duke . |
| 1,388,024 | 8/1921 | Clairemont et al. . |
| 1,520,424 | 12/1924 | McCullough . |
| 1,888,415 | 11/1932 | Swenson . |
| 1,922,143 | 8/1933 | Sharp . |
| 1,943,468 | 1/1934 | Bridgeman et al. . |
| 2,001,628 | 5/1935 | Niernick . |
| 2,184,063 | 12/1939 | Meyer et al. . |
| 2,222,000 | 11/1940 | Schmidt . |
| 2,236,773 | 4/1941 | Fischer . |
| 2,337,666 | 12/1943 | Koonz et al. . |
| 2,423,233 | 7/1947 | Funk . |
| 2,438,168 | 3/1948 | Hearst et al. . |
| 2,439,808 | 3/1948 | Hodson . |
| 2,497,817 | 2/1950 | Hale et al. . |
| 2,565,311 | 8/1951 | Koonz et al. . |
| 2,673,160 | 3/1954 | Feeney et al. . |
| 2,758,935 | 8/1956 | Shaffer . |
| 2,776,214 | 1/1957 | Lloyd et al. . |

(List continued on next page.)

FOREIGN PATENT DOCUMENTS

| | | |
|---|---|---|
| 2680951-A1 | 3/1993 | France . |
| 72454 | 4/1953 | Netherlands . |
| 242780 | 11/1925 | United Kingdom . |
| WO 92/21254 | 12/1992 | WIPO . |
| WO 95/12320 | 5/1995 | WIPO . |
| WO 95/14388 | 6/1995 | WIPO . |
| WO 95/18538 | 7/1995 | WIPO . |
| WO 97/07691 | 3/1997 | WIPO . |

OTHER PUBLICATIONS

E.M. Funk, "Pasteurization of Shell Eggs," University of Missouri, College of Agriculture, Agricultural Experiment Station, Research Bulletin 364, pp. 1–28 (May 1943).

M.E. St. Louis, "The Emergence of Grade A Eggs as a Major Source of *Salmonella Enteritidis* Infections," JAMA vol. 259, No. 14, pp. 2103–2107 (Apr. 8, 1988).

E.M. Funk, "Maintenance of Quality in Shell Eggs by Thermostabilization," University of Missouri, College of Agriculture, Agricultural Experiment Station, Research Bulletin 467, pp. 1–46 (Dec. 1950).

Food Industry, vol. p 341, Mar. 1948, p. 71.

E.M. Funk, "Stabilizing Quality in Shell Eggs," University of Missouri, College of Agriculture, Agricultural Experiment Station, Research Bulletin 362, pp. 1–38 (Apr. 1943).

Remington's Pharmaceutical Sciences, 16th Edition, Mack Publishing Co., Easton, PA (1980).

Oliver Products Company, "The Oliver® Aqua–Therm™/Compu–Therm™ Water Convection Oven System," Brochure No. 11134–1–5/93.

Database Abstract. AN: 78(04): Q0043 FSTA. USSR Patent, 577009. Inventors: Krivopishin et al, (1997).

*Primary Examiner*—Anthony J. Weier
*Attorney, Agent, or Firm*—Oliff & Berridge, PLC

[57] ABSTRACT

An apparatus, a method and a flat for pasteurizing a plurality of layers of in-shell eggs without substantially impairing the functionality of the in-shell eggs. The apparatus includes a fluid bath, heat exchangers, a means for vertically perturbating the entire surface of in-shell eggs loosely held in a plurality of flats forming at least one stack thereof.

41 Claims, 18 Drawing Sheets

U.S. PATENT DOCUMENTS

| | | |
|---|---|---|
| 3,027,734 | 4/1962 | Mills . |
| 3,028,245 | 4/1962 | Mink et al. . |
| 3,046,143 | 7/1962 | Lowe et al. . |
| 3,082,097 | 3/1963 | Haller . |
| 3,113,872 | 12/1963 | Jones et al. . |
| 3,144,342 | 8/1964 | Collier et al. . |
| 3,148,649 | 9/1964 | Moore et al. . |
| 3,321,316 | 5/1967 | De Paolis et al. . |
| 3,364,037 | 1/1968 | Mink et al. . |
| 3,420,790 | 1/1969 | Gassner et al. . |
| 3,440,831 | 4/1969 | Thompson . |
| 3,461,680 | 8/1969 | Rische . |
| 3,522,061 | 7/1970 | Whiteford . |
| 3,658,558 | 4/1972 | Rogers et al. . |
| 3,663,233 | 5/1972 | Keszler . |
| 3,831,389 | 8/1974 | Lipona . |
| 3,843,813 | 10/1974 | Driggs . |
| 3,865,965 | 2/1975 | Davis et al. . |
| 3,882,686 | 5/1975 | Rose . |
| 4,045,579 | 8/1977 | Rogers . |
| 4,157,650 | 6/1979 | Guibert . |
| 4,302,142 | 11/1981 | Kuhl et al. . |
| 4,362,094 | 12/1982 | Polster . |
| 4,503,320 | 3/1985 | Polster . |
| 4,524,082 | 6/1985 | Liot . |
| 4,524,083 | 6/1985 | Liot . |
| 4,537,208 | 8/1985 | Kuhl . |
| 4,558,661 | 12/1985 | Theilig et al. . |
| 4,666,722 | 5/1987 | Creed et al. . |
| 4,702,777 | 10/1987 | Kuhl . |
| 4,808,425 | 2/1989 | Swartzel et al. . |
| 4,999,471 | 3/1991 | Guarneri et al. . |
| 5,179,265 | 1/1993 | Sheridan et al. . |
| 5,283,072 | 2/1994 | Cox et al. . |
| 5,290,583 | 3/1994 | Reznik et al. . |
| 5,431,939 | 7/1995 | Cox et al. . |
| 5,445,062 | 8/1995 | Polster . |
| 5,474,794 | 12/1995 | Anderson et al. . |
| 5,494,687 | 2/1996 | Polster . |
| 5,589,211 | 12/1996 | Cox et al. . |
| 5,694,836 | 12/1997 | Blevins . |

APPARATUS AND METHODS FOR PASTEURIZING IN-SHELL EGGS

BACKGROUND OF THE INVENTION

The present invention is directed to apparatus and methods for simultaneously pasteurizing a large number of in-shell eggs without substantially impairing their functionality. This invention further relates to a flat for use in the apparatus and methods.

It is desirable to pasteurize viable and non-viable in-shell eggs for a variety of reasons. The most important of these reasons is providing in-shell eggs that are safe for consumption by the public at large. Pasteurization can reduce the level of various microorganisms that are typically present both on the shell and inside the shell of a whole egg, including within the egg albumin and within the egg yolk.

With regard to pathogens present on and/or inside an in-shell egg, especially a chicken egg, a common pathogen is Salmonella. A variety of other microorganisms may also be present on and/or within in-shell chicken eggs. See E. M. Funk, Pasteurization of Shell Eggs, University of Missouri, College of Agriculture, Agricultural Experiment Station, Research Bulletin 364, pp. 1–28 (May 1943), incorporated herein by reference in its entirety.

While the following comments are directed to chicken eggs, these comments may also apply to other types of in-shell eggs. In the early 1900's, it was appreciated that chicken eggs were pathogenically contaminated on their outer shell. Such contamination was believed to be caused by surface contact with, for example, fecal matter, contaminated animal feed, other contaminated material and the like. It was further believed that in-shell eggs were contaminated within the egg shell by penetration of pathogens through the pores thereof. It has only recently been discovered that bacteria such as Salmonella and, especially, *Salmonella enteritidis*, enters the egg yolk of an in-shell egg via trans-ovarian transmission (i.e., from the mother to the egg even before the egg is laid by the hen). See, M. E. St. Louis et al., The Emergence of Grade A Eggs as a Major Source of *Salmonella enteritidis* Infections, JAMA, Volume 259, No. 14, pp. 2103–2107 (Apr. 8, 1988), incorporated herein by reference in its entirety. Until the presence of trans-ovarian transmission was discovered in the 1980's, the need to pasteurize against such trans-ovarian contamination remained unrecognized.

To provide in-shell chicken eggs safe for human consumption without cooking, the Food & Drug Administration (FDA) has proposed requiring at least about a 3 to 5 log reduction in the pathogen count of various microorganisms present in and/or on the in-shell eggs. Those skilled in the art of in-shell egg pasteurization will recognize that a 5 log reduction refers to a reduction in the count of a pathogen by a factor of 5 logs or to a value of $\frac{1}{100,000}$ of the initial value. Unless about a 3 to 5 log reduction in, for example, the Salmonella count or that of other pathogens on and/or inside an in-shell chicken egg, particularly, in the egg yolk, is achieved, such an egg does not comply with the proposed requirements of the FDA relating to in-shell chicken eggs.

While a 3 to 5 log reduction may be generally provided by heating an in-shell egg, care must be taken not to substantially impair its functionality. The functionality of the in-shell egg affects its market value. For example, if the functionality of an in-shell egg is impaired, then the egg albumin will not rise or foam (as desired or necessary) upon whipping, or the yolk will not be firm and the like. A functionally impaired egg is considered an inferior egg for its culinary uses including baking and the like.

The functionality of a pasteurized in-shell egg may be measured by a number of methods. For example, one measure is the ability of the egg albumin to properly rise or foam upon whipping. A functionally impaired egg may manifest an inordinately reduced whipping volume, a substantially increased whipping time and/or the like. Another measure of functionality is the height of an egg yolk and/or albumin after the in-shell egg has been cracked open on a flat, substantially horizontal, ambient temperature (e.g., 20–25° C.) surface. Typically, the functionality may be measured in Haugh units. See E. M. Funk, Stabilizing Quality in Shell Eggs, University of Missouri, College of Agriculture, Agricultural Experiment Station, Research Bulletin 362, pp. 1–38 (April 1943), incorporated herein by reference in its entirety.

An in-shell egg that exhibits a Haugh value of less than about 60 Haugh units would be considered to have a substantially impaired functionality. However, for example, if in a batch of 100 eggs, 90% of the eggs have a value of no less than about 60 Haugh units, then it is considered that the functionality of the batch has not been substantially impaired. Preferably, it is desirable to have 90–95%, more preferably 95–98% and most preferably 99–100% of pasteurized in-shell chicken eggs in a given batch to have a Haugh value of no less than about 60 Haugh units.

Ordinarily, in-shell eggs are collected from the hen house, washed, size graded and separated according to their grading (e.g., S, M, L, XL, Jumbo and the like). Thereafter, the eggs may be pasteurized to achieve at least about a 3 to 5 log reduction. To achieve the necessary pasteurization level, the eggs may be heated for a set time period for the particular size (i.e., grade) of in-shell eggs. Data relating to pasteurization times and temperature is known. Such information may be used to achieve at least about a 3 to 5-log reduction in the pathogen count. See co-pending Davidson International Application No. PCT/US96/13006 (U.S. application Ser. No. 08/519,184), entitled Pasteurized In-Shell Chicken Eggs And Method For Production Thereof, filed on Aug. 9, 1996, incorporated herein by reference in its entirety. See also, International Application No. PCT/US95/00254 (WO 95/18538), and U.S. Pat. No. 2,423,233, each incorporated herein by reference in its entirety. None of these patents, patent applications or publications disclose simultaneous pasteurization of a large number of in-shell eggs. Further, none of these references address the problems encountered when attempting to pasteurize large commercial quantities of in-shell eggs without impairing their functionality.

While pasteurizing may be accomplished by heating the eggs to the desired pasteurization level, several difficulties are encountered when attempting to pasteurize commercial quantities of in-shell eggs in an efficient, fast and cost-effective manner. Typically, large volume commercial operations involve transporting one or more batches of, for example, several hundred to thousands of dozens of eggs (e.g., 1,000 to 6,000 dozen eggs) at a time. However, such large commercial quantities of in-shell eggs cannot be pasteurized together as a single batch without substantially impairing egg functionality (e.g., at least about 60 Haugh units per batch) using known procedures.

When pasteurizing commercial quantities of in-shell eggs to a safe level, the ability to maintain their market quality is critically important. The market quality of pasteurized eggs should be sufficient to market them to the public (for consumption). However, maintaining market quality depends on successfully pasteurizing commercial quantities of in-shell eggs without substantially impairing their functionality. Thus, pasteurization as well as stabilization of egg quality (e.g., a Haugh value of no less than about 60 Haugh units, preferably no less than about 70 Haugh units and, more preferably no less than about 80 Haugh units) in a cost efficient manner is paramount, especially for large scale commercial operations to remain successful.

However, pasteurizing, for example, a thousand or more dozens of in-shell eggs at a time within about an hour or two has been exceedingly difficult or impossible to accomplish, if the functionality of substantially all of the in-shell eggs in a batch is not to be substantially impaired. This is especially so when attempting to achieve a pasteurization level of at least about 3 to 5 logs.

U.S. Pat. No. 2,423,233 discloses a conventional process for preserving eggs for consumption. This process, however, fails to address various problems associated with pasteurizing of commercial quantities of in-shell chicken eggs without substantially impairing their functionality. There is, therefore, a need to provide apparatus and methods for rapidly and cost effectively pasteurizing in-shell eggs without substantially impairing their functionality.

SUMMARY OF THE INVENTION

In one embodiment of the invention, a process for pasteurizing at least one stack of a plurality of layers of in-shell eggs comprises:

enveloping at least one stack of a plurality of layers of in-shell eggs in at least one heated fluid until the eggs are pasteurized by absorbing heat from the fluid or transferring heat between the fluid and the in-shell eggs without substantially impairing their functionality.

The above-noted process may be carried out, for example, in an apparatus for pasteurizing in-shell eggs, comprising:

means for enveloping at least one stack of a plurality of layers of in-shell eggs in heated fluid until the eggs are substantially uniformly pre-heated throughout the stack (s); and means for maintaining the enveloped stack(s) in heated fluid until the eggs are sufficiently heated to be pasteurized by absorbing heat from the fluid or transferring heat between the fluid and the in-shell eggs, all without substantially impairing their functionality.

The in-shell eggs may be loosely held in at least one flat. Such a flat for holding a layer of in-shell eggs may comprise:

a plurality of raised contours projecting from a horizontal plane, the raised contours being discontinuous to provide openings; and a plurality of lower contours projecting from the horizontal plane spaced for accepting the plurality of raised contours from a vertically adjacent flat, whereby adjacent raised and lower contours of adjacent flats form at least one cavity for loosely holding at least one egg, wherein the cavity is sufficiently open to allow perturbation of a heated fluid through the cavity and along an entire surface of substantially all the eggs held in substantially all the cavities when at least one layer of eggs is enveloped in a fluid.

BRIEF DESCRIPTION OF THE DRAWINGS

The Figures associated with this invention are not necessarily drawn to scale and should not necessarily be so construed.

DETAILED DESCRIPTION OF PREFERRED EMBODIMENTS

Figure 1:
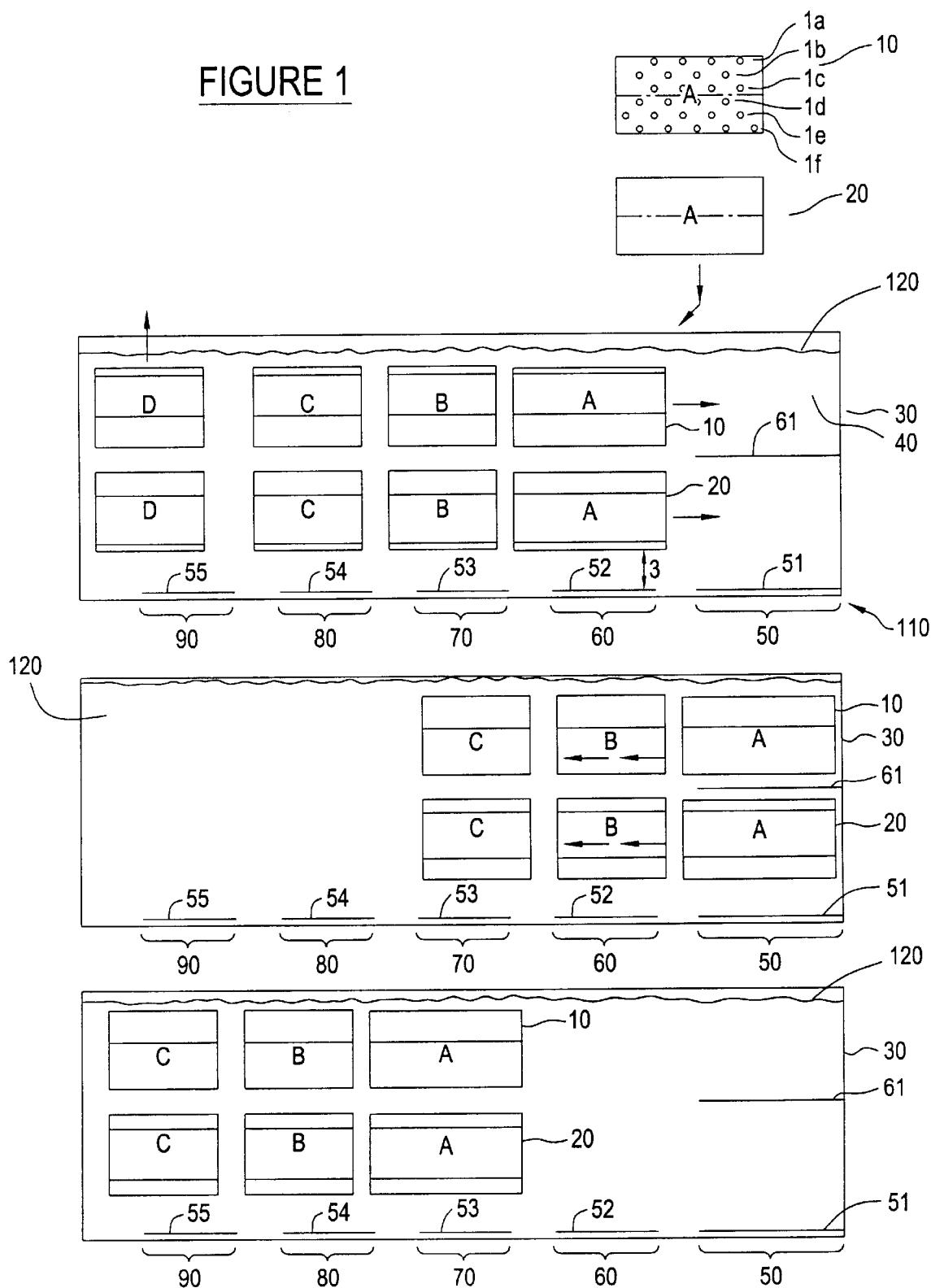
FIG. 1 schematically represents one embodiment of the claimed process.

In commercial operations, it is not efficient or cost-effective to pasteurize a single egg, a single row or even a single layer of in-shell eggs at a time. To the contrary, in a competitive market, it is most desirable to pasteurize at least one batch of several tens, hundreds, or thousands of dozens of eggs together.

To handle large batches of in-shell eggs for transportation or the like, it is known to provide these in-shell eggs in a plurality of layers formed into stacks. The stacks most standard in the industry contain about 6 layers of in-shell eggs (or multiples thereof, e.g., 12, 18, 24, 30, 36, etc.) per stack. Further, each layer of in-shell eggs contains about 30 in-shell eggs (or multiples thereof, e.g., 60, 90, 120, 150, 180, etc.). When a plurality of these layers of in-shell eggs are formed into one or more stacks, the stacks contain in-shell eggs located at their periphery extending all the way to their center. Conveniently, each layer of eggs is held in a 6 egg by 5 egg flat. Sometimes, such flats may not all be fully filled with 30 eggs; however, incompletely filled flats add to the cost and inefficiency of the process.

A problem that has prevented heat pasteurizing at least one stack of a plurality of egg layers while stabilizing their market quality (e.g., maintaining the desired functionality) is that the in-shell eggs within a stack nearest the heat-source would pasteurize quicker than the eggs located farther away. Thus, for example, the result is that either (1) the in-shell eggs nearest the heat source are properly pasteurized without substantially impairing their functionality while the in-shell eggs farther away from the heat source are insufficiently pasteurized; or (2) the in-shell eggs nearest the heat source and those farther away are sufficiently pasteurized but the in-shell eggs nearest the heat source have their functionality substantially impaired. Other such undesirable combinations of improper pasteurization and/or impaired functionality are also encountered.

Without being bound by theory, it is believed this problematic disparity between in-shell eggs nearest the heat source versus those farther away is caused by a number of factors. For example, the eggs nearest the heat source absorb much more heat and/or absorb heat at a much faster rate than the eggs farther away during heat pasteurization. This is partly because eggs nearest the heat source are first in line to absorb the available heat than the eggs farther away. Further, chicken eggs readily absorb heat at a faster rate until the temperature just inside the shell approaches from about 110° F. to about 120° F., for example, during heat pasteurization. This causes the heat content of a fluid surrounding the eggs nearest the heat source to be rapidly reduced by the eggs. Heat added from outside the stack is also rapidly absorbed by the closest eggs. Thus, the peripheral eggs of the stack absorb much more heat than eggs centrally located in the stack. As a result, the problematic disparity in temperature of the eggs in the stack becomes more and more pronounced. This disparity becomes even more dramatic when the size of the eggs, the size of the layers (i.e., number of eggs per layer), the number of layers per stack and/or the number of stacks being pasteurized together in one or more batches of a plurality of stacks are increased.

Furthermore, it is preferred that the pasteurization cycle for a single batch (e.g., one or more stacks of 5 dozen to 6,000 or more dozen eggs per batch) is from about several minutes to about several hours, preferably, from about several minutes to about 2 hours and, most preferably, from about several minutes to about 1–2 hours or less.

According to the invention, it has surprisingly been discovered that at least one stack of a plurality of layers of in-shell eggs can be rapidly, efficiently and cost-effectively pasteurized both at the periphery (or at locations nearest a heat source and locations farthest away from the heat source) and in the interior (all the way to the center) of the stack without substantially impairing the functionality of the in-shell eggs.

An apparatus and a method for efficiently, cost effectively and quickly pasteurizing at least one stack, i.e., two or more layers, of in-shell eggs without substantially impairing their functionality is provided. A flat for loosely holding at least one layer of in-shell eggs is also provided. It is desirable that a plurality of these flats form at least one stack of in-shell eggs wherein it is possible to pasteurize the entire stack (so formed) of in-shell eggs without substantially impairing their functionality.

Figure 1A:
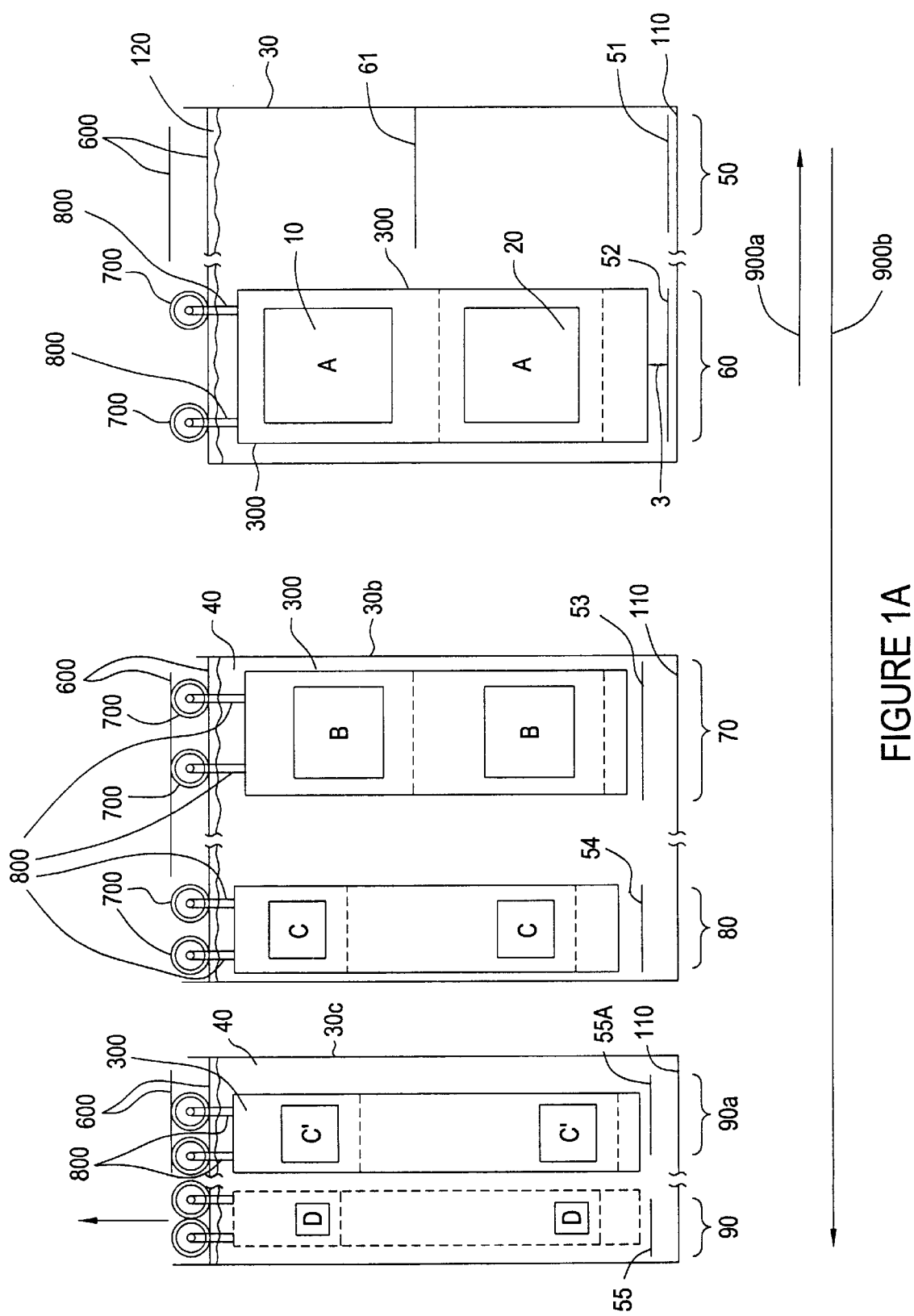
FIG. 1A schematically represents another embodiment of the claimed process.
Figure 1B:
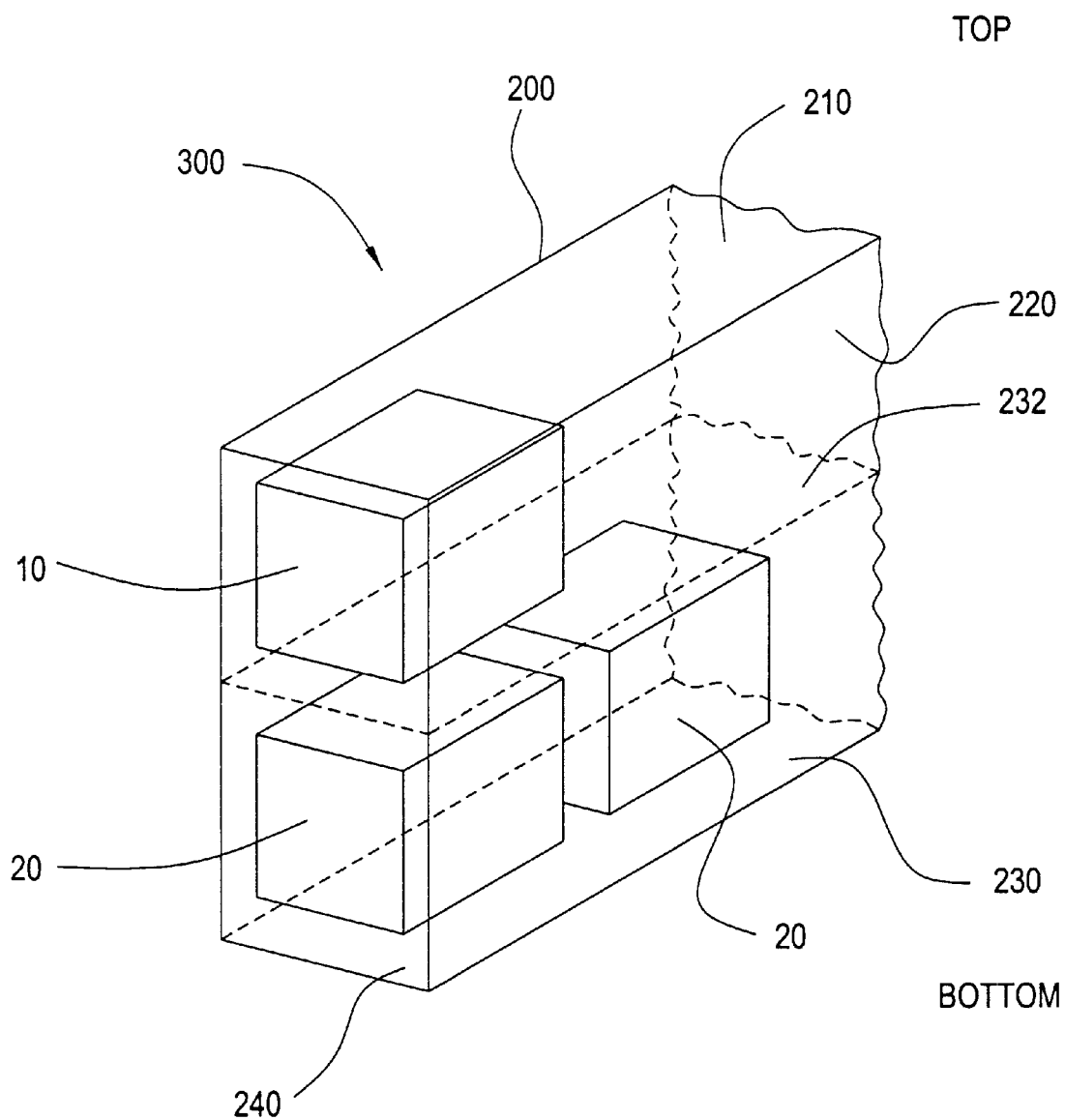
FIG. 1B schematically depicts a perspective view of one embodiment of a carrier for use with the present invention.

In FIGS. 1 and 1A, stacks 10 and 20 of six layers (1a, 1b, 1c, 1d, 1e and 1f; see FIG. 1E) of in-shell eggs 5 in a plurality of flats (2a, 2b, 2c, 2d, 2e, 2f and 2g; see FIG. 1E) are shown. Instead of top flat 2a, a wire mesh cover or the like may be used. Further, a plurality of stacks 10 and 20 is depicted. At various stages of the pasteurization process, these stacks are immersed in fluid 40, which may be contained in fluid bath(s) 30, 30a, 30b and/or 30c. More particularly, the stacks (10 and 20) are lowered into a receiving zone 60 of bath 30 or bath 30a. Thereafter, according to the embodiments depicted in FIGS. 1 and/or 1A, stacks 10 and 20 may be transferred to a pre-heating zone 50 of bath 30 or 30a. Further, in accordance with various stages of the pasteurization process as shown in FIGS. 1 and 1A, the stacks are enveloped by heated fluid 40 contained in baths 30, 30a, 30b and/or 30c. While it is preferred to use the same fluid in each of the baths, different fluids may be used.

According to one embodiment of the invention, temperature control of the bath(s) and/or stacks of eggs therein may be achieved using an integration control system which is described in co-pending patent application Ser. No. 09/001,677, filed on Dec. 31, 1997, which is incorporated herein by reference in its entirety.

The desired precision to which the eggs are pre-heated or heated may be provided by a combination of several elements. These elements may include, but are not limited to, at least one pre-heater, at least one heater, at least one temperature sensor, at least one means for perturbating fluid in the bath(s) sufficient to substantially uniformly heat each of the eggs in the stack, preferably by vertical perturbation, and one or more flats for holding the eggs and allowing perturbation of the fluid around the entire surface of each egg held therein. U.S. Pat. No. 4,503,320 (Polster), incorporated herein by reference in its entirety, describes an exemplary temperature sensor and temperature control system suitable for use in conjunction with the present invention. See also Patent Cooperation Treaty application no. PCT/US94/12790 (WO 95/12320), incorporated herein by reference in its entirety. Further, see U.S. patent application Ser. Nos. 08/640,746 (filed May 6, 1996) and 08/148,915 (filed Nov. 5, 1993; now U.S. Pat. No. 5,494,687), each incorporated herein by reference in its entirety.

According to the embodiments of FIGS. 1 and 1A, a plurality of temperature sensors may be placed throughout baths 30, 30a, 30b, and/or 30c. Preferably, at least two sensors per zone (e.g., 50, 60, 70, 80, 90a and/or 90) are provided. These sensors are preferably spaced substantially vertically apart sufficient to accurately monitor the temperature of fluid 40. These sensors are also connected to the control system. The temperature sensors and the control system may thus be used to maintain the heating temperature sufficient to pasteurize the stack(s) of in-shell eggs without substantially impairing their functionality.

A means for perturbating the fluid next to, between and around the in-shell eggs in the stacks (e.g., stacks 10 and 20) is preferably provided. The perturbation is preferably provided in a vertical direction emanating from below or adjacent to the heat source(s) and being directed upwards towards and through the stacks and layers of in-shell eggs. The perturbation should be sufficient to substantially perturbate the fluid around the entire surface of each egg held in the stack(s). A preferred means for vertically perturbating a liquid fluid surrounding the in-shell eggs held in one or more stacks of flats comprises flowing bubbles of at least one gas, such as $CO_2(g)$, $Ar(g)$, air or the like through fluid 40. Air is, of course, inexpensive, abundant and safe for handling.

Preferably, the gas is provided through a gas supply line. Preferably, the gas line outlet(s) are located at or near the bottom 110 of bath(s) 30, 30a, 30b and/or 30c. For example, the gas line outlet(s) may be located at level 110. Further, the gas line outlet(s) are preferably located between and/or below the heaters 51, 52, 53, 54, 55a, 55 and/or 61 depicted in FIGS. 1 and 1A. As the gas is released, bubbles of the gas rise through fluid 40, through carrier 300, through stacks 10 and 20, through flats 2a–2g, around the entire surface of each egg, to the surface 120 of fluid 40. The bubbles on their way to the surface 120 help to equalize the temperature of fluid 40 and thus the temperature of eggs in the stacks immersed in fluid 40.

In embodiments, the supply of bubbles to perturbate the fluid around the entire surface of each in-shell egg in one or more stacks may be provided by a regenerative blower. Preferably, the regenerative blower will have a capacity (e.g., measured in cubic feet per minute (CFM)) at least equal to about the surface area (e.g., measured in square feet) of the fluid being perturbated in the bath(s). For example, for a surface area at surface 120 of about 100 square feet, the blower should have a capacity of generating at least about 100 CFM of gas.

Figure 1C:
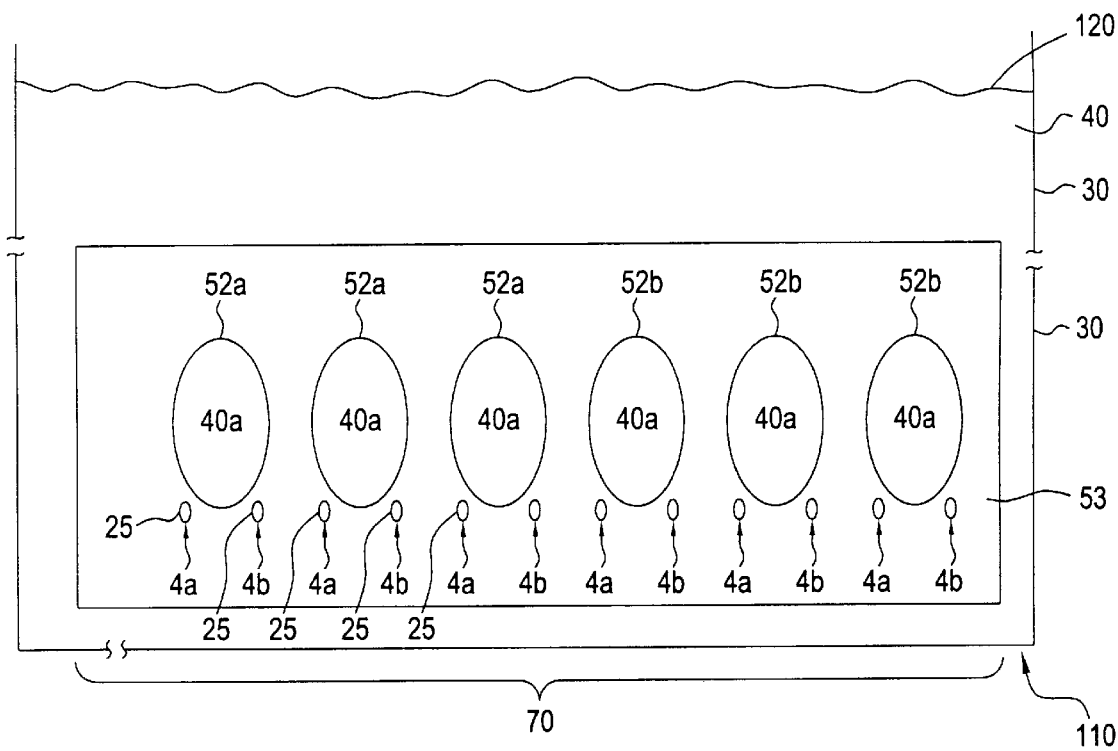
FIG. 1C depicts a cross-sectional view of one embodiment of a heater or pre-heater for use in accordance with the present invention.
Figure 1D:
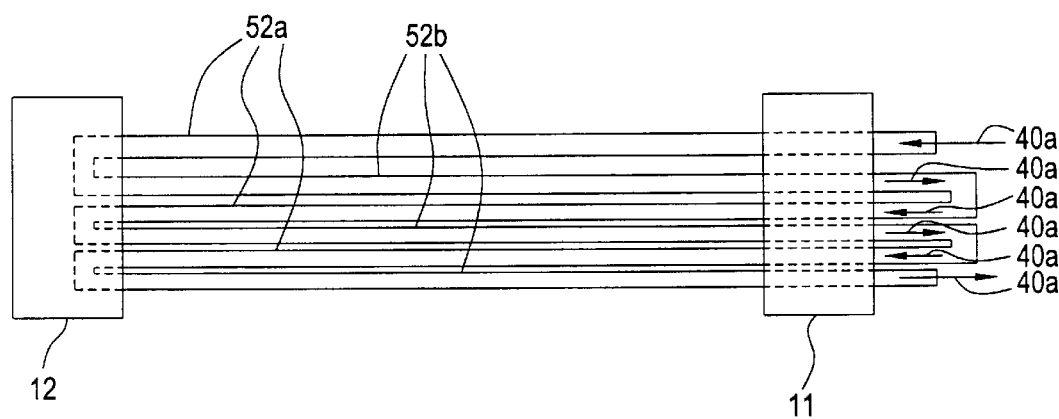
FIG. 1D is a top view of the heater/pre-heater of FIG. 1C.
Figure 1E:
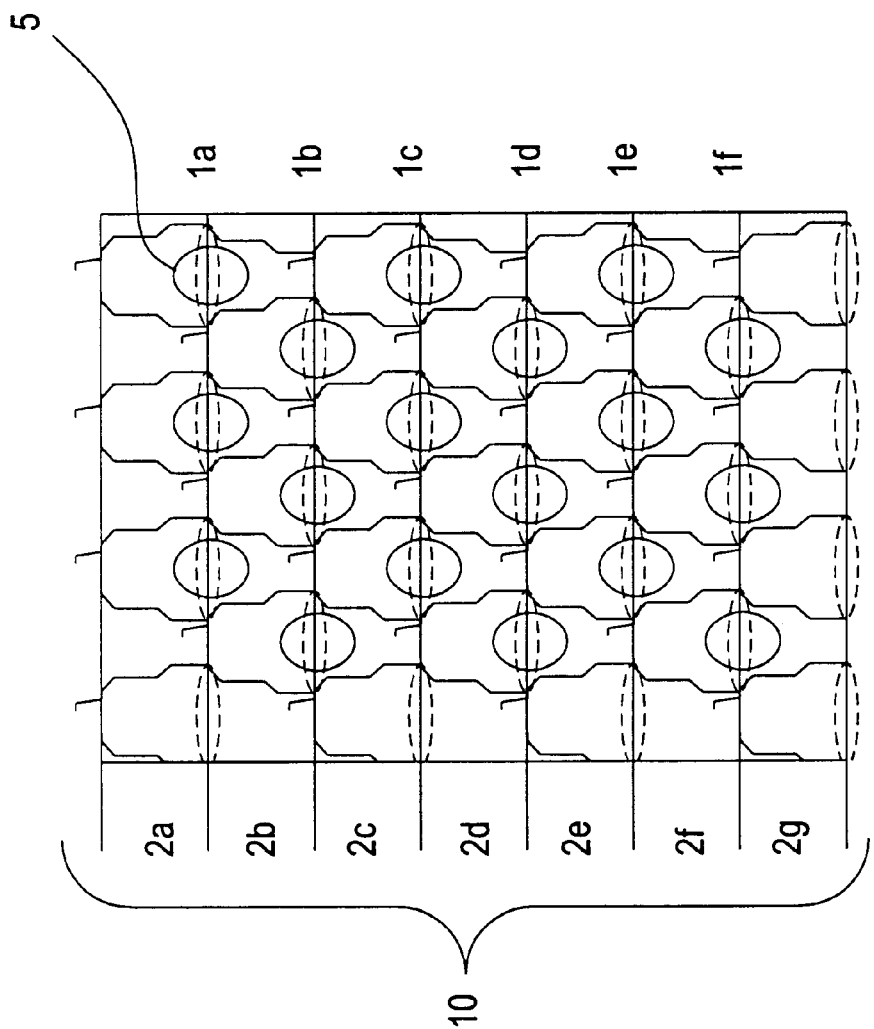
FIG. 1E depicts a stack of a plurality of layers of in-shell eggs.

Now referring to FIGS. 1C and 1D, heating coils or tubes 52a and 52b may form one or more loops having heat exchange fluid 40a flowing therein. Additionally, in FIG. 1C, cross-sections of sets of gas tubes 4a and 4b are depicted. These gas tubes 4a and 4b provide a source of bubbles of gas 25 flowing therein and being released into the bath. Preferably, the gas tubes are located below or adjacent to heating tubes 52a and/or 52b. However, configurations other than that depicted in FIGS. 1C and 1D may also be used. Such other configurations should be sufficient to perturbate and thereby uniformly distribute heat through fluid 40. It should also be sufficient to perturbate the fluid along the entire surface of each egg and thereby allow uniform heating of the eggs in the stacks.

When a plurality of baths, as in FIG. 1A, is used, appropriate conveyor means for transporting one or more stacks of eggs between the various zones contained therein are provided. Alternatively, however, a single bath may be used. According to the embodiments of FIGS. 1 and 1A, eggs are preferably received in a batch of stacks of 15 dozen eggs per stack or the like. Preferably, each stack comprises about 2, 3, 4, 5, 6 or more perforated flats (e.g., perforated trays described in greater detail below for holding at least one layer of eggs per flat) of 6, 12, 24 to 30 or more in-shell eggs or the like per flat. In embodiments, eighteen stacks of eggs may be placed, for example in two rows of nine stacks per row, on a carrier 300. See FIG. 1B. This carrier is preferably compatible with standard chicken egg handling equipment used in the egg industry.

Carrier 300 preferably has, for example, mounts represented by the combination of wheels 700 and extensions 800 shown in FIG. 1B. Other types and configurations of mounts or other conveying, loading and unloading means may suitably be used with the present invention as will be readily understood by one of ordinary skill in the art. Therefore, while too numerous to list, such mounts and such other loading, unloading and/or conveying means and conveying systems are useful in the present invention. The exemplary mounts (comprising wheels 700 and extensions 800 in FIG. 1B) permit the loader/unloader to load and unload the stacks in and out of fluid 40 as well as transport the stacks laterally from one zone to another as desired. The mounts, if any, should preferably allow continuous and/or discontinuous (e.g., intermittent) lateral movement of the stacks enveloped by fluid 40 as well as movement of the stacks in and out of fluid 40.

As depicted in FIG. 1B, carrier 300 may be of a rectangular or square shape; however, any shape sufficient to hold one or more stacks may be used. Further, carrier 300 may be provided with one or more intermediate shelves such as shelf 232 for supporting one or more rows of stacks such as 10 and 20. Further, some or all of the faces of carrier 300 should be sufficiently perforated (i.e., open or permeable) to permit fluid 40 to readily enter into carrier 300 and to pass through all the stacks and layers and to envelope all the eggs contained therein. Also, carrier 300 should be sufficiently open to permit adequate perturbation preferably, vertical perturbation, of the fluid over the entire surface of all the eggs to permit uniform heating of all the eggs. For example, faces 210 and 230 and shelf 232 may be formed from a wire mesh or some other open structure sufficient to allow fluid 40 to envelope all the eggs and yet strong enough to support the weight of the stacks whether in or out of fluid 40. In addition, carrier 300 should be formed of a material that can be reused and which does not interfere with the process, apparatus, and flats of the present invention.

One or more carriers 300 may be used. For example, one carrier for each batch A, B, C and D may be provided in the embodiment of FIG. 1. Further, while each carrier is depicted as holding two rows of stacks, any number of one or more rows, one or more stacks and one or more batches may be pasteurized together in one pasteurization cycle.

Preferably, the egg carrier 300 is strong enough to hold at least about 270 dozen eggs while being loaded, unloaded or otherwise moved by the material handling system. In addition, it is preferred that the carrier 300 be compatible with standard egg loading, unloading and moving equipment used in the egg industry. It is preferred that the carrier 300 have a shape and a size such that it rests in a stable position when placed on a substantially horizontal surface—i.e., the carrier 300 should not readily tip over either when empty or when filled with stacks of eggs.

It is further preferred that the egg carrier 300 be sufficiently open to allow liquid and gas bubbles to pass substantially unimpeded through it and through the stacks of eggs contained therein. It is preferred that carrier 300 be heavy enough to overcome the buoyancy of the perforated flats and eggs forming the stacks contained therein. Preferably, the weight of the carrier 300 should be sufficient such that it will not float out of its carrier track as it moves through bath(s) 30, 30a, 30b and/or 30c. The carrier 300 should preferably also maintain the stacks contained therein in a relatively secure fashion such that the stacks can be readily loaded and unloaded into the carrier 300 and the carrier 300 can be readily moved vertically and/or laterally through the bath(s) without tipping, breaking or otherwise damaging the in-shell eggs.

The fluid 40 may include, but is not limited to, at least one gas, at least one liquid, a mixture of at least one gas and at least one liquid, fluidized solids, or the like. Examples of a suitable gas include carbon dioxide, air, nitrogen, any inert gas and the like. Examples of a suitable liquid include water, including salt water, and oil such as cooking oil. Fluidized solids may include, for example, a fluidized bath of a metal oxide such as alumina, magnesium oxide, etc., and the like. Further, for example, the fluid 40 may be an emulsion, suspension, dispersion or the like of, for example, wax in water. According to one embodiment, the emulsion, suspension, dispersion or the like is heated to a temperature sufficient to melt or liquefy the wax. The fluid may include one or more preservatives or other additives, so long as it is compatible for use with heat pasteurization of in-shell eggs for edible consumption.

Referring to FIGS. 1 and 1A, the fluid 40, though depicted as a liquid in FIG. 1, may be one or more gases. Preferably, however, fluid 40 is at least one liquid. The fluid 40 may be a combination of two or more liquids. It is preferred that the fluid be substantially non-volatile at the bath temperature, the pasteurization temperature, and at ambient temperature and pressure.

Referring to FIG. 1A, the three baths 30*a*, 30*b* and 30*c*, may, for example, contain a heated fluid 40 such as water. In each of these exemplary baths, it is possible to provide several, for example, six or more zones per bath (e.g., zones 50, 60, 70, 80, 90*a* and/or 90 as depicted in FIGS. 1 and 1A). Further, it can be helpful to provide additional lateral space in each bath. It is of course understood that the minimum width of each zone will be dictated by the size of the carrier 300 to be used. Further, the minimum height of each bath will also be determined by the height of carrier 300 and the space required between the top and bottom rows of stacks of eggs contained therein. Additional space may also be provided above the height of the carrier 300 immersed in fluid 40. This additional height can accommodate the further addition of fluid 40 to the bath(s) or level changes in the fluid due, for example, to movement of the carrier into and from the bath(s), and flow rate changes of the gas.

It is preferred that the fluid bath(s) be of a sufficient size to allow complete immersion therein of one or more carriers 300 (fully loaded with one or more stacks of eggs) without spilling fluid 40 from the bath(s). Preferably, each bath contains a drain and a drain system to allow removal of fluid 40 from the bath(s) as necessary. It is also preferred that space (e.g. at least about 6 inches) be provided between the bottom of each carrier and the heat exchangers or heaters and/or pre-heaters provided within heating and pre-heating zones contained in the bath(s).

The bath(s) of FIGS. 1 and 1A contain fluid 40 which is heated by exemplary pre-heaters (e.g., 51 and 61) and heaters (e.g., 52, 53, 54, 55*a*, and 55). These heaters and/or pre-heaters may, for example comprise metallic or other heat conductive material in the form of tubing, preferably formed to maximize the transfer of heat from fluid 40*a* flowing therein to fluid 40 of the bath(s). Preheaters and heaters 51–55 may preferably be placed near the bottom of the fluid baths. One example of the tubes forming the heaters and/or pre-heaters is shown in FIGS. 1C and 1D. Alternatively, for example, the pre-heaters (e.g., 51 and/or 61) may be low watt density electric heaters.

Now referring to FIGS. 1 and 1A, after the eggs in stacks 10 and 20 are lowered into receiving zone 60, the stacks are preferably transferred to pre-heating zone 50 for pre-heating. They are thereafter transferred to the other zones as described herein. The transferring means may be a conveyor 600 (see FIG. 1A) or the like. Other transferring means well known to those skilled in the art may also be used. In the embodiments of FIGS. 1 and 1A, one or more pre-heaters 51, typically disposed below lower stack 20 and optionally one or more additional pre-heaters 61 typically disposed between upper (stack 10) and lower (stack 20) stacks are provided. Though only two pre-heaters 51 and 61 (i.e., one pre-heater per stack) are depicted, more pre-heaters may be provided such as, for example, one pre-heater per six or fewer layers of said eggs. For example, for stacks of 6 layers of eggs per stack and 30 eggs per layer, it is preferred to provide at least one pre-heater disposed adjacent to and below each such stack. It is also preferred that space (e.g., at least about 6 inches) be provided between the bottom of each stack and the nearest pre-heater.

Because heated fluid tends to rise through the stack(s), orientation of the pre-heaters below each stack is preferred. However, any other orientation that adequately and uniformly heats the fluid 40 in the pre-heating zone 50 sufficient to uniformly pre-heat the eggs may be used. Though not shown, for example, two or more pre-heaters may be inserted in a single stack. Alternatively, as noted, a single pre-heater may be disposed below and adjacent to each stack of 6 or fewer layers.

Preferably, the pre-heaters are substantially equally spaced apart in a vertical direction sufficient to substantially uniformly pre-heat all of the eggs in stacks 10 and 20 (or eggs in a plurality of stacks occupying pre-heating section 50 if more than two stacks 10 and 20 are located there) at a heating rate sufficient to uniformly attain a desired pre-heating temperature of all the eggs in about the same amount of time. However, the pre-heaters may be advantageously spaced apart in any desired orientation or configuration sufficient to uniformly achieve a desired pre-heating temperature of substantially all of the in-shell eggs. For example, two stacks or subparts of stacks may be pre-heated side by side in a pre-heating zone, and then placed over one another in a further heating zone.

After a sufficient pre-heating time, the pre-heated temperature of the eggs in the stack(s) is preferably in the desired pre-heating temperature range. Typically, the pre-heating time for all the stacks is from about 1 minute to about 15 minutes, for example from about 2 minutes to about 12 minutes or about 3 minutes to about 12 minutes for pre-heating about 270 dozen eggs contained in at least one batch of about eighteen stacks of 6 layers per stack, each layer containing about 30 in-shell eggs.

Typically, the initial temperature of the stack(s) of eggs when being lowered into the receiving zone 60 is from about 35° F. to about 80° F., for example from about 65° F. to about 75° F. or about 70° F. However, the in-shell eggs may be warmer or cooler. Thus, the pre-heating time may vary. During pre-heating, these eggs preferably absorb a sufficient amount of energy from the fluid to raise the yolk temperature of substantially all the eggs to at least about 85° F., for example to a range from about 89° F. to about 137.5° F., preferably, from about 95° F. to about 120° F. and, more preferably, from about 99.5° F. to about 106° F. Additionally, it is preferred that by the time the above-noted pre-heating of one or more stacks of eggs is accomplished, the pre-heating zone bath temperature is substantially recovered.

The pre-heating time may vary, for example by about ±25%, depending upon such factors as the number of eggs per layer, the size of the eggs in each layer, the number of layers, the number of stack(s) being pre-heated in at least one batch and the initial egg temperature.

For a water containing fluid bath, exemplary bath temperatures (for pre-heating, heating and/or pasteurizing without substantially impairing egg functionality) from about 120° F.±2° F. to about 140° F.±2° F. Even more preferably, the desired bath temperature to which all the eggs occupying the pre-heating and other zones are heated is from about 130° F.±2° F. to about 140°±2° F. Even more preferably, the desired bath temperature is from about 133.5° F.±1° F. to about 137.5° F.±1° F. Preferably, the precision to which the bath temperature is controlled is about ±2° F., more preferably, about ±1° F., even more preferably, about ±0.1° F. and, yet even more preferably, about ±0.03° F.

A plurality of heaters (such as 52, 53, 54, 55*a* and/or 55) per zone (e.g., 50, 60, 70, 80, 90*a* and/or 90) may be provided in fluid 40. Preferably, if a plurality of heaters is provided per zone, then the heaters may be substantially equally spaced apart. However, the heaters should be located to advantageously maintain the desired fluid temperature substantially uniformly throughout the bath. In addition to heaters and pre-heaters, at least one temperature sensor, is connected to the baths 30, 30a, 30b and/or 30c containing fluid 40. The temperature sensor may also be connected to an integration system which controls the heaters to substantially uniformly maintain the temperature of fluid 40 within the desired pre-heating temperature range and the desired pasteurizing temperature range. Each temperature range is preferably maintained to substantially within a precision of less than or equal to about ±2° F., preferably, ±1° F., more preferably, ±0.1° F. and, even more preferably, ±0.03° F.

Ordinarily, the first zone 70, intermediate zone(s) 80, 90a and/or exit zone 90 are provided with at least one heater. Optionally, the receiving zone 60 is also provided with at least one heater (e.g. heater 52). The heater(s) are preferably disposed adjacent to and below the lowest stack (e.g., stack 20 of FIGS. 1 and 1A) and separated by a distance 3. Distance 3 depends, for example, upon the heating capacity of heaters such as 51, 52, 53, 54, 55a and 55. Distance 3 should be sufficient to allow heat pasteurization of all eggs provided within all stacks of at least one batch (e.g., batch A of stacks 10 and 20 depicted in FIGS. 1 and 1A) without substantially impairing their functionality in one heat pasteurizing cycle. For example, distance 3 may be adjusted so that the vertical distance from the pre-heater(s) and/or heaters to the bottom egg layer is from about 6 inches to about 12 inches.

While the receiving zone 60, the pre-heating zone 50, the first zone 70, the optional intermediate zone 80 and the exit zone 90 are depicted as part of a single fluid bath 30 in FIG. 1, some or all of these various zones may each comprise a separate bath. See, for example, FIG. 1A. In addition, while these zones are discretely represented in FIGS. 1 and 1A, the zone boundaries (not shown) can be contracted or expanded to accommodate the size of the eggs, the size of the batch, the type of egg (e.g., chicken egg versus other types of eggs), the level of pasteurization desired, the level of functionality desired, the fluid bath temperatures, and the like. Thus, for example, zone 60 and the other zones may be narrower or wider depending on at least the above-noted factors than as depicted in FIGS. 1 and 1A, and may be combined into a single area of a bath.

In FIGS. 1 and 1A, each of the zones 60, 70, 80, 90a and 90 is depicted with one heater 52, 53, 54, 55a and 55 per zone, respectively. The pre-heating zone 50 is depicted with two pre-heaters 51 and 61. While FIGS. 1 and 1A depict embodiments of the invention, the number and location of zones, pre-heaters, heaters (e.g., heat-exchangers) and temperature sensors, means for perturbation of fluid 40 and the like may be varied so that the pre-heating and pasteurizing of one or more stacks of a plurality of layers of in-shell eggs can be accomplished without substantially impairing egg functionality.

Thus, for example, for pasteurizing from about 270 to about 350 stacks of in-shell eggs containing 6 layers per stack of 30 in-shell eggs per layer, the total pre-heating and pasteurization cycle time may, in embodiments, be from about 30 minutes to about 3 hours, preferably, under about 2 hours, and more preferably, under about 1 hour.

Preferably, when all of the fluid 40 in the heating zones (e.g., 60, 70, 80, 90a and/or 90a) and the pre-heating zone(s) (e.g., 50) is appropriately heated, the system is ready to receive a batch of one of more stacks of eggs. Thus, a loader or a material handling system (MHS) engages a loaded carrier 300 for transport. See FIG. 1B for a depiction of an exemplary carrier 300 filled with a plurality of stacks of eggs. The loader then lowers carrier 300 into receiving zone 60. The material handling system uses, for example, a conveyor 600 to move the egg-loaded carrier 300 from zone 60 to pre-heating zone 50.

Then, referring to FIGS. 1 and/or 1A, for example, batch A is pre-heated to the desired temperature. With reference to the embodiments depicted, once batch A is pre-heated to the desired temperature, the conveyor 600 may then move the eggs from zone 50 back to zone 60 in, for example, bath 30a of FIG. 1A. Similarly, conveyor 600 moves the eggs from zone 60 to zone 70 in, for example, bath 30 of FIG. 1. According to the embodiment of FIG. 1A, the loader/unloader then removes carrier 300 out of bath 30a and lowers it into bath 30b, zone 70. Prior to this operational step, for example, batch B in bath 30b, zone 70 has been removed to zone 80 while batch C has been removed to zone 90a and batch D has been removed from bath 30c. Further, in general, conveyor 600 or the like may be used to move eggs from one zone to any one of the other zones of a single bath or multiple baths.

In FIG. 1A, dashed lines outlining carrier 300 loaded with batch D indicate an exemplary position of batch D immediately before its removal from bath 30c. In general, arrows 900a and 900b (FIG. 1A) indicate the overall direction of movement of a single batch through the apparatus of FIG. 1A. It is noted that movement in the direction of arrows 900a and 900b may be continuous or intermittent (i.e., discontinuous) or some combination thereof.

According to the embodiments of FIGS. 1 and 1A, after the eggs in the stack(s) occupying the pre-heating zone 50 are heated to the desired temperature, these pre-heated eggs are transferred to a first zone 70 in bath 30 or bath 30b. Any stacks of eggs previously occupying the first zone 70 are transferred to the optional one or more intermediate zones 80 (only one optional intermediate zone is shown; however, a plurality of intermediate zones may be present within baths 30, 30a, 30b and/or 30c). Any stacks of eggs previously occupying the exit zone 90 (or the last zone in each of baths 30a, 30b and/or 30c depicted in FIG. 1A) are preferably removed from bath 30 (or baths 30a, 30b and/or 30c of FIG. 1A) by an unloader/loader. The unloader/loader may be configured to load batch A into fluid 40 and unload batch D out of fluid 40. While such an unloader/loader or its motion in and out of fluid 40 is not shown, it is imputed herein and is readily understood by one of ordinary skill in the art of moving in-shell eggs, especially chicken eggs and the like.

Typically, the movement of stacks of eggs from one zone to another is accomplished sequentially and/or simultaneously. If transferred sequentially, any of the stacks of eggs in the exit zone 90 are removed first, then eggs nearest the exit zone (e.g., zone 90a or zone 80) are transferred to the exit zone 90 and so on until eggs from the pre-heating zone 50 are transferred to the first zone 70. However, other combinations of movements which are well known to those of ordinary skill in the art may be used for moving the eggs.

By the time the eggs have been finally removed from exit zone 90, that batch of eggs has been sufficiently heated in a substantially uniform manner sufficient to provide about a 3 log or more, preferably about a 5 log or more, reduction of pathogens, e.g., Salmonella, in and/or on substantially all of the eggs of the batch without substantially impairing their egg functionality.

The heat pasteurizing cycle represents the time from the moment the stacks are enveloped by one or more heated fluids until the eggs are finally removed from the heated fluid(s) for the last time. Even after the eggs are finally removed from fluid 40, heat pasteurization of the in-shell eggs continues until the temperature of the eggs is reduced below heat pasteurization temperatures, for example, from below 116° F. to about 120° F. Thus a cooling step may be desired after pasteurization is complete. See co-pending U.S. patent application Ser. No. 09/001,673, which is hereby incorporated by reference in its entirety.

During a single complete heat pasteurization cycle of at least one batch of stacked layers of in-shell eggs, the temperature of the egg albumin, egg yolk and the intact shell should be sufficiently raised for a time to provide at least about a 3-log reduction, preferably at least about a 5-log reduction of, for example, Salmonella or other pathogenic microbes without substantially impairing egg functionality (e.g., a functionality of not less than about 60 Haugh units).

Preferably, the entire heat pasteurization cycle is carried out with the eggs in flats such as those depicted in FIGS. 2–16 and described herein below.

Figure 2:
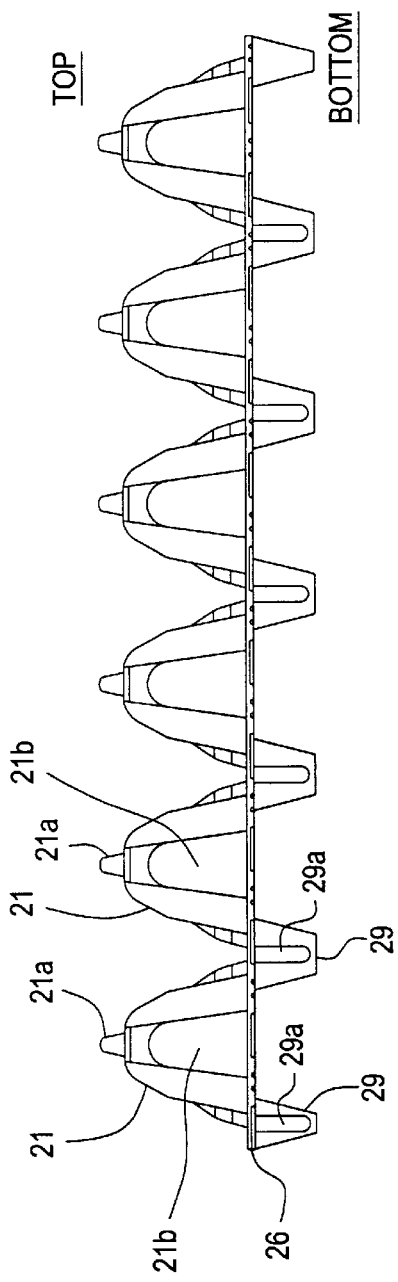
FIG. 2 is a side cross-sectional view of one embodiment of a flat in accordance with the present invention.

Referring to FIG. 2, an exemplary flat used with the apparatus and method of the present invention is depicted. In FIG. 2, the flat comprises raised contours 21 with tips 21a and openings 21b. The flat of FIG. 2 further comprises a horizontal plane 26 and lower contours 29 having openings 29a.

Figure 3:
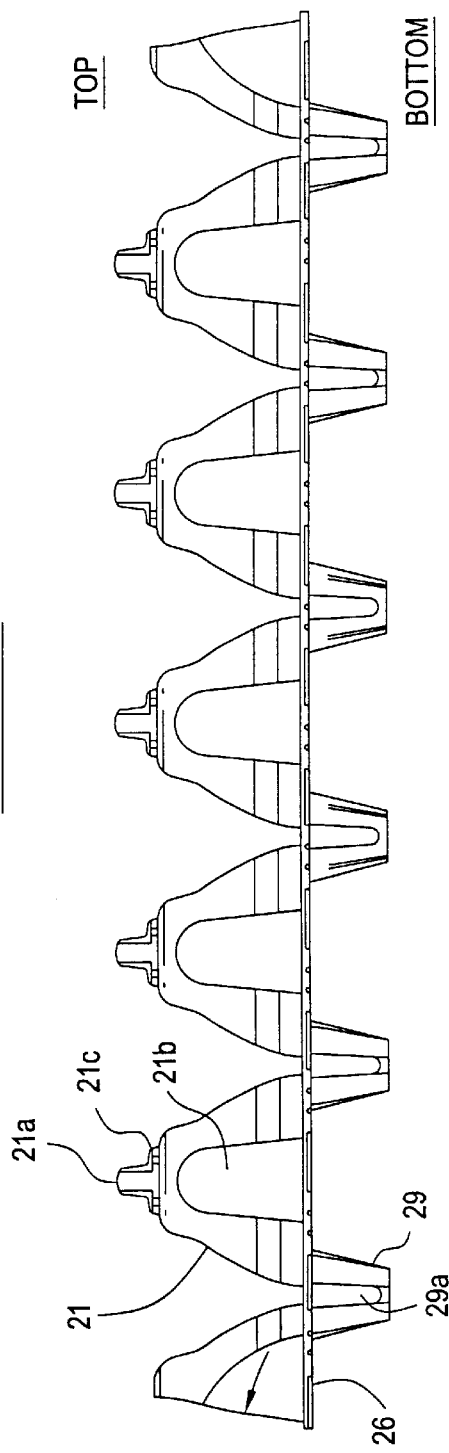
FIG. 3 is a side cross-sectional view of another embodiment of a flat of the present invention.
Figure 11:
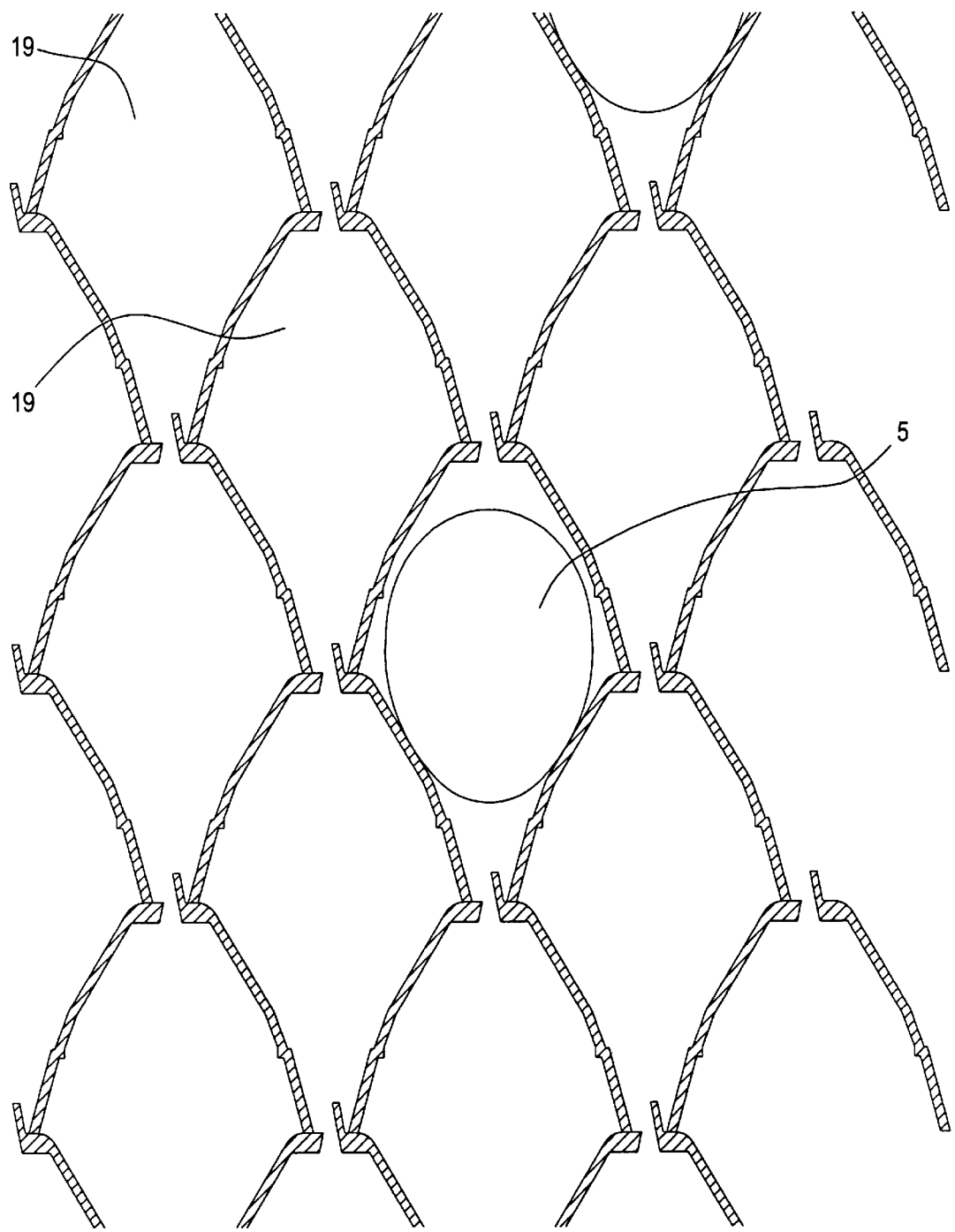
FIG. 11 is a partial cross-sectional view depicting oriented stacking of flats for holding layers of in-shell eggs.

FIG. 3 depicts another exemplary embodiment of a flat useful with the apparatus and method of the present invention. The flat of FIG. 3 is similar to that of FIG. 2; however, the raised contours 21 have the added feature of shoulders 21c at the base of tips 21a. These shoulders 21c prevent the flats from excessively sticking to one another when stacked in the form of a stack as depicted in FIG. 11. The shoulders make it easier to (1) unstack the flats from the stacked configuration of FIG. 11; (2) allow fluid to flow through the stack; and/or (3) prevent clogging and/or sticking of adjacent flats. Sticking is a particular concern when using wax as a means for sealing eggs during pasteurization according to co-pending U.S. patent application Ser. No. 09/001,674, incorporated herein by reference in its entirety.

Figure 5:
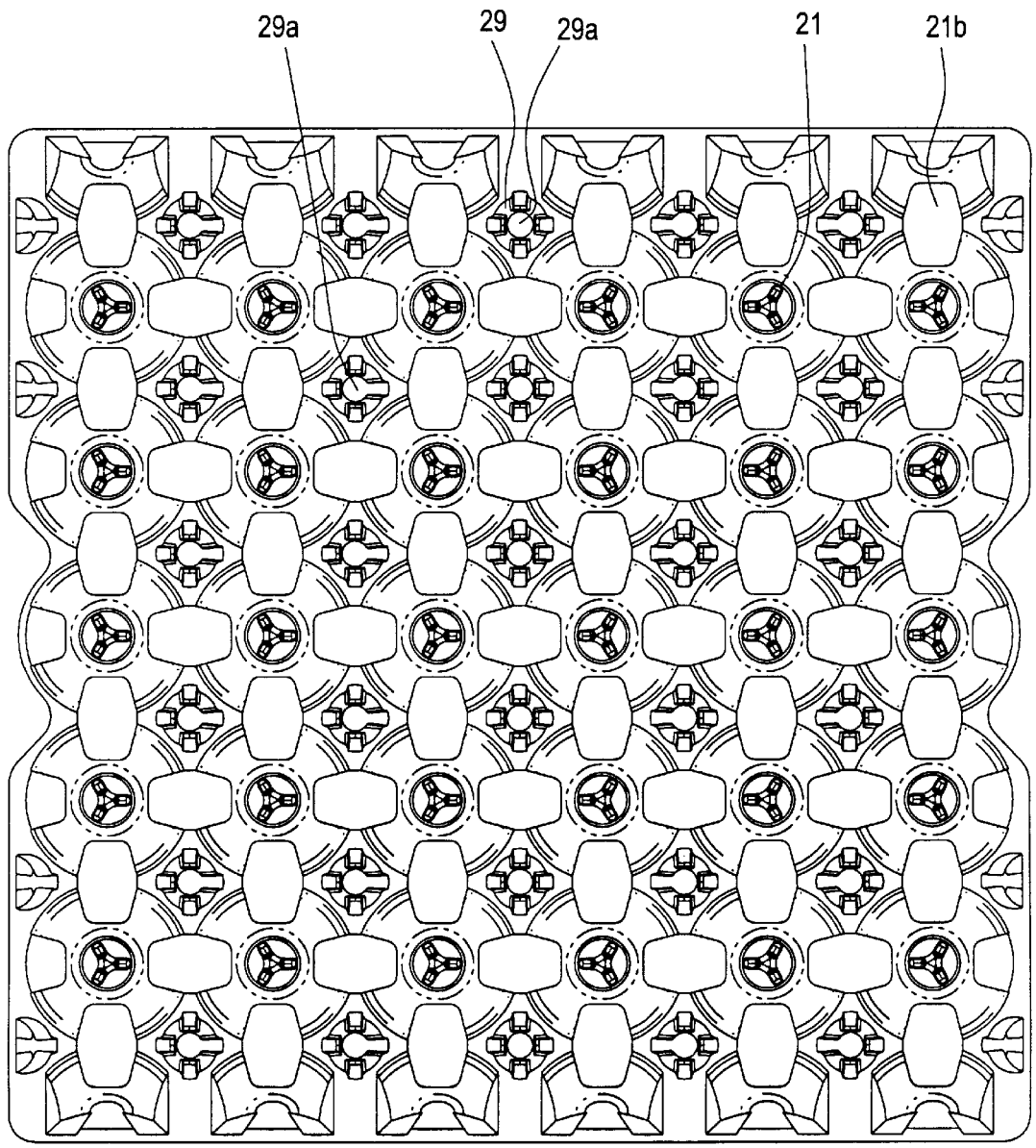
FIG. 5 is a top plan view of the flat of FIG. 3.
Figure 6:
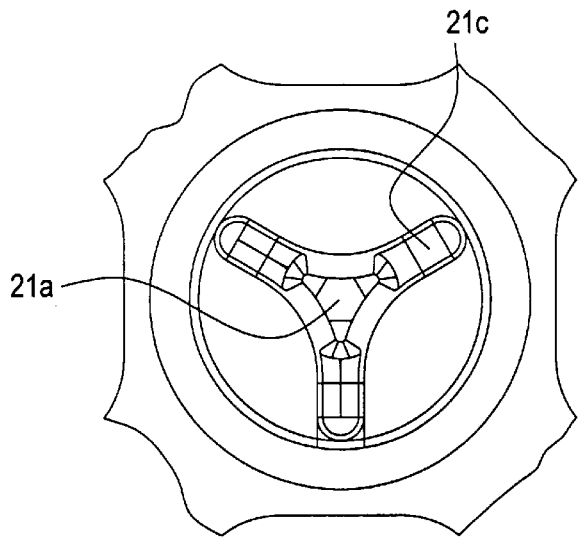
FIG. 6 is a top plan view of the tip 21a of a raised section 21 depicted in FIGS. 3 and 5.

FIG. 6 shows a top view of tip 21a depicted in FIGS. 3 and 5.

Figure 4:
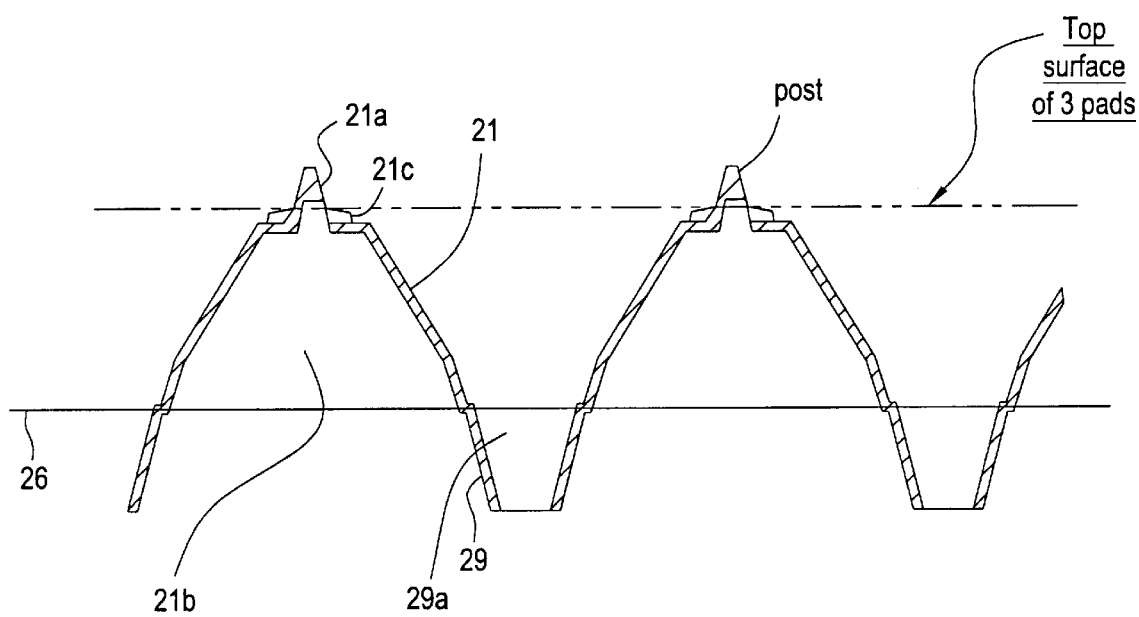
FIG. 4 is a side cross-sectional view of another embodiment of a flat of the present invention.
Figure 8:
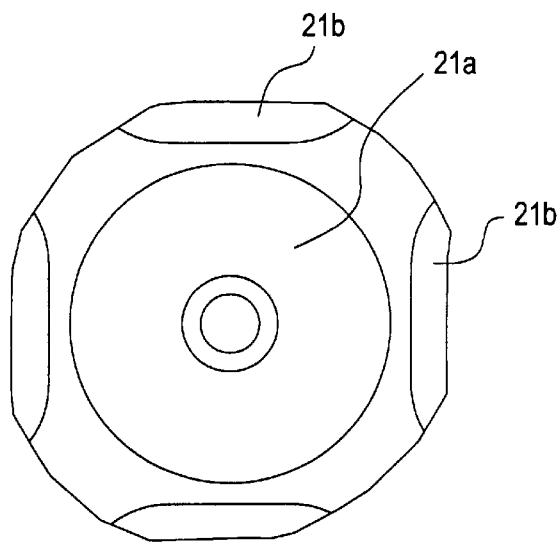
FIG. 8 is a bottom plan view of the tip of a projection 21a depicted in FIG. 7.
Figure 9:
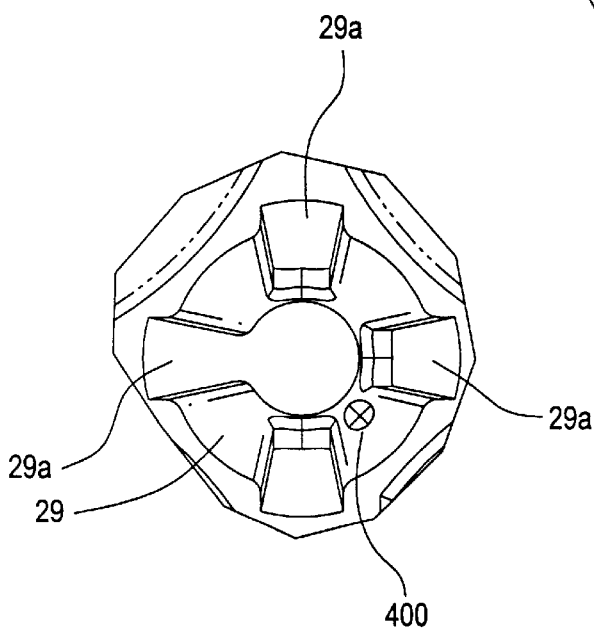
FIG. 9 is a bottom plan view of a lower projection 29 depicted in FIG. 7.
Figure 7:
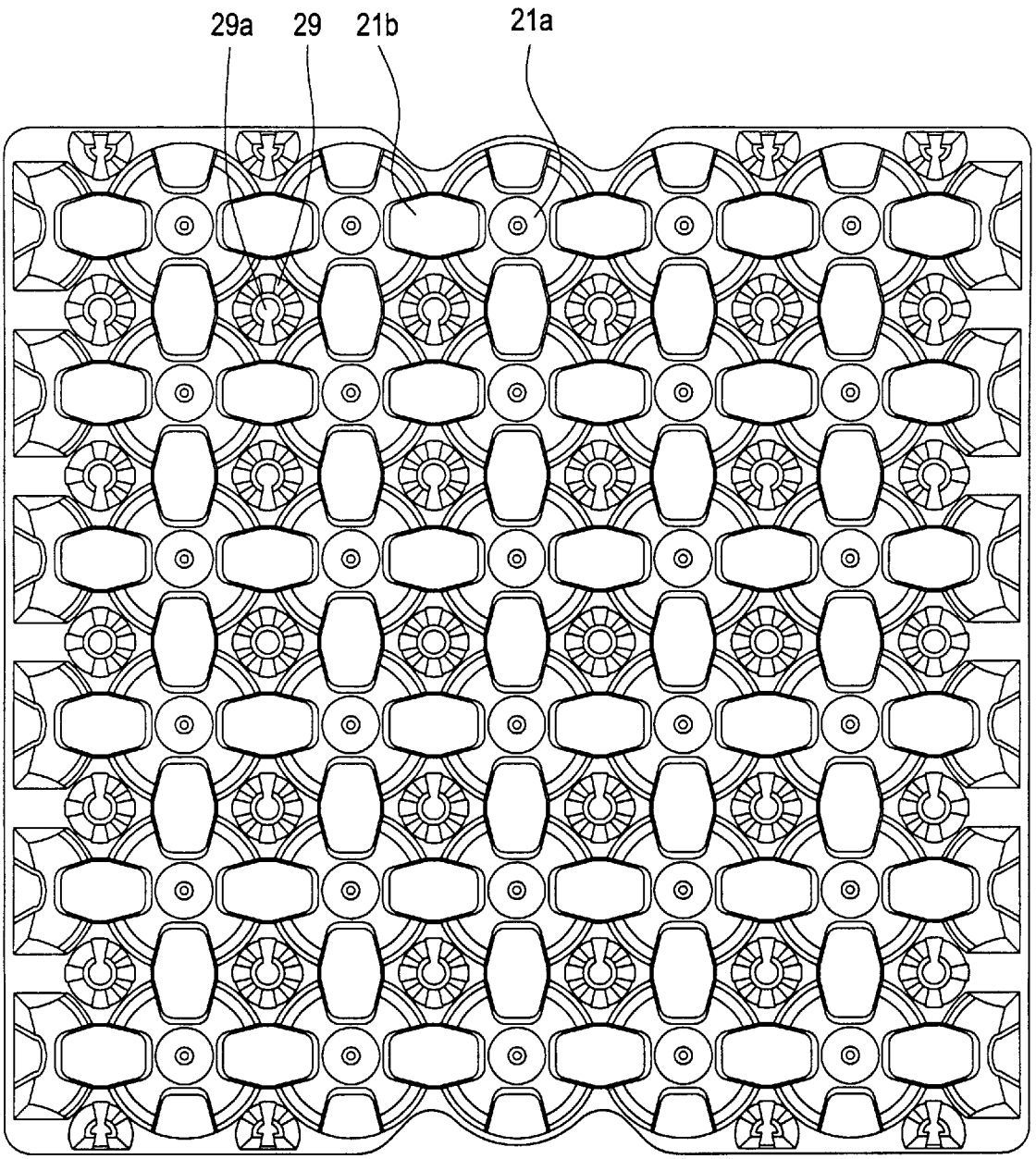
FIG. 7 is a bottom plan view of the flat of FIG. 3.

FIG. 4 depicts another cross-sectional view of an embodiment of a flat useful with the apparatus and method of the present invention. FIG. 5 depicts a top view of the flat of FIG. 3. FIG. 7 is a bottom view of the flat of FIG. 3. FIG. 8 is a bottom view of the tip 21a of the raised contour 21 depicted in FIGS. 3 and 5 and visible in the bottom perspective view of FIG. 7. FIG. 9 is a top view of the lower contour 29 visible in the top view of FIG. 5. In FIG. 9, some lower contours 29 contain a small bump 400 designed to prevent the flats from excessively sticking together when stored in the form of a nested stack as depicted in FIG. 10.

Figure 10:
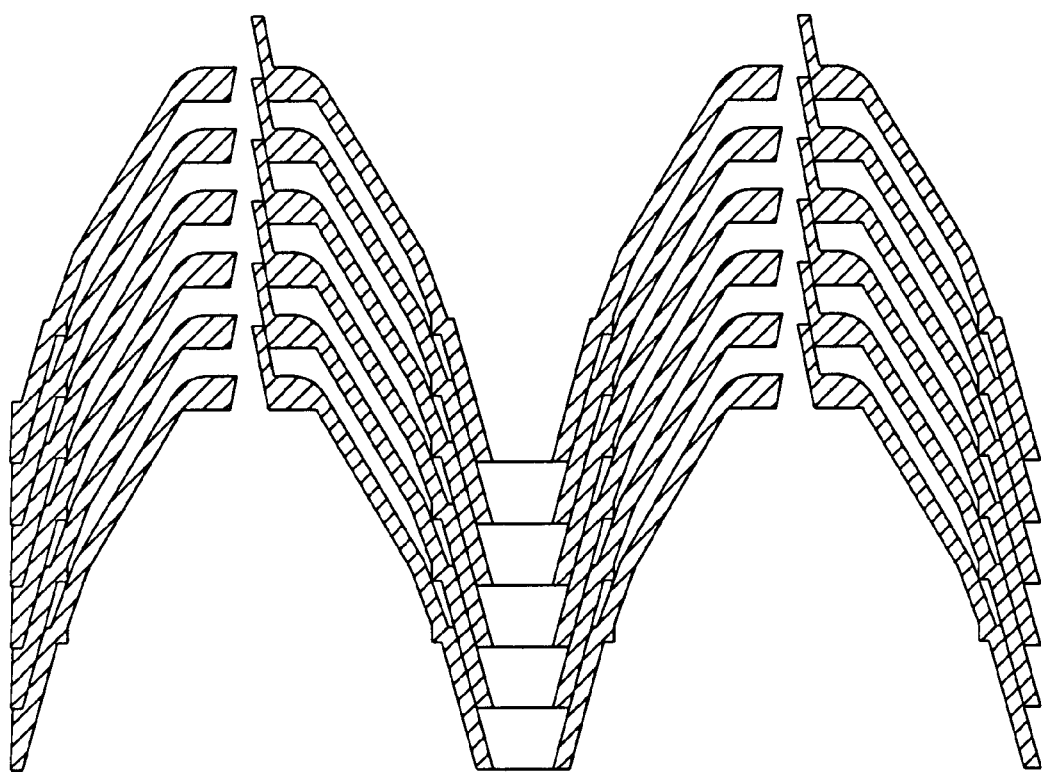
FIG. 10 is a partial cross-sectional view depicting nested stacking of flats of the invention when no eggs are held within the flats.

FIG. 10 depicts a nested stack of a plurality of flats of the present invention. Nesting of the flats allows a convenient means of storing the flats when not in use.

FIG. 11 depicts oriented stacking of the flats of FIGS. 2, 3, 4, 5, 6, 7, 8, 9 and/or 10. In such oriented stacking, the raised contours 21 and tips 21a cooperatively fit into the lower contours 29 to form a cavity 19 sufficient to preferably loosely hold an egg 5 (or a plurality of eggs) in a plurality of layers. Nested stacking can be converted to oriented stacking by rotating adjacent flats by 90° in the horizontal plane (i.e., about a vertical axis) of the flat from the nested configuration shown in FIG. 10 and vice versa.

Figure 12:
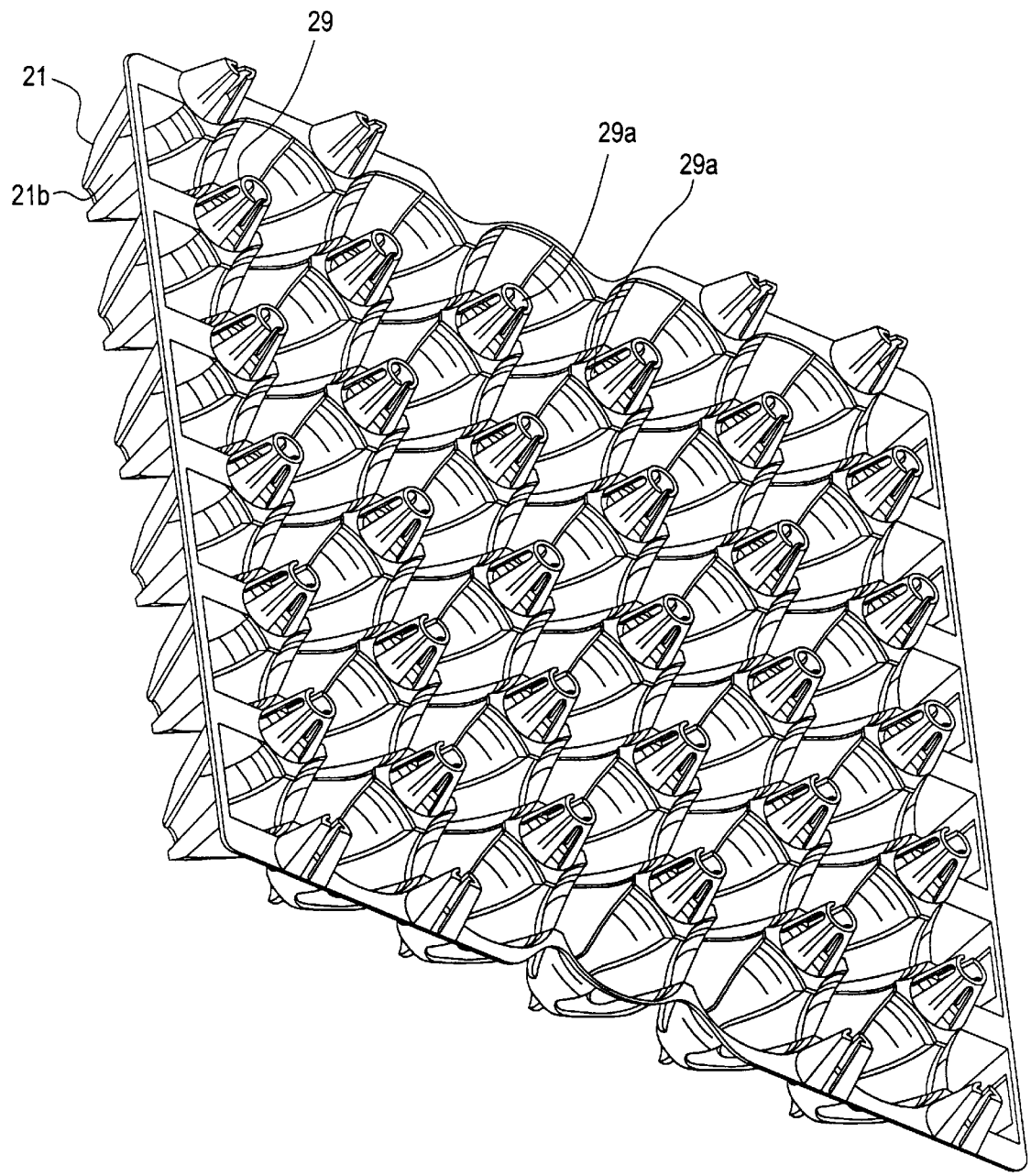
FIG. 12 is a perspective view from the bottom of a flat of the invention.
Figure 13:
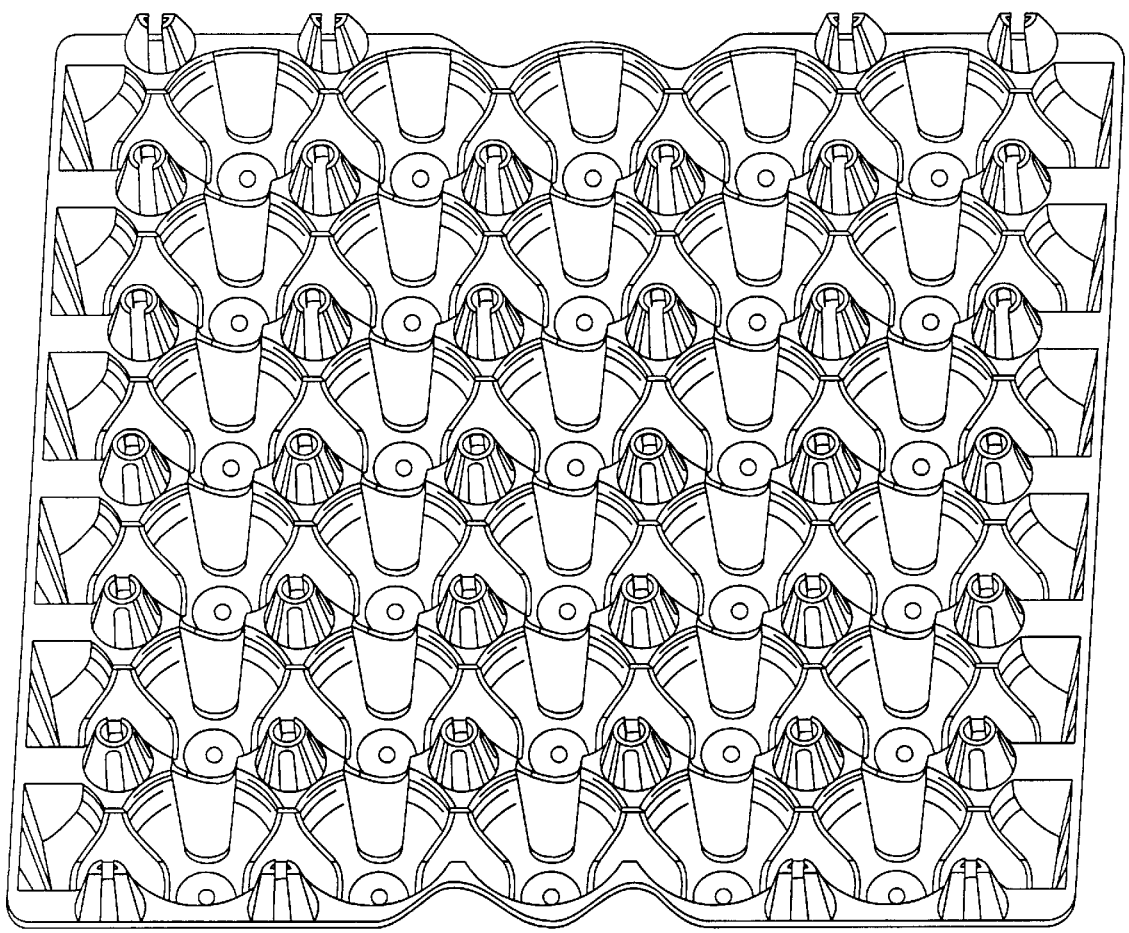
FIG. 13 is another perspective view from the bottom of a flat of the invention.
Figure 14:
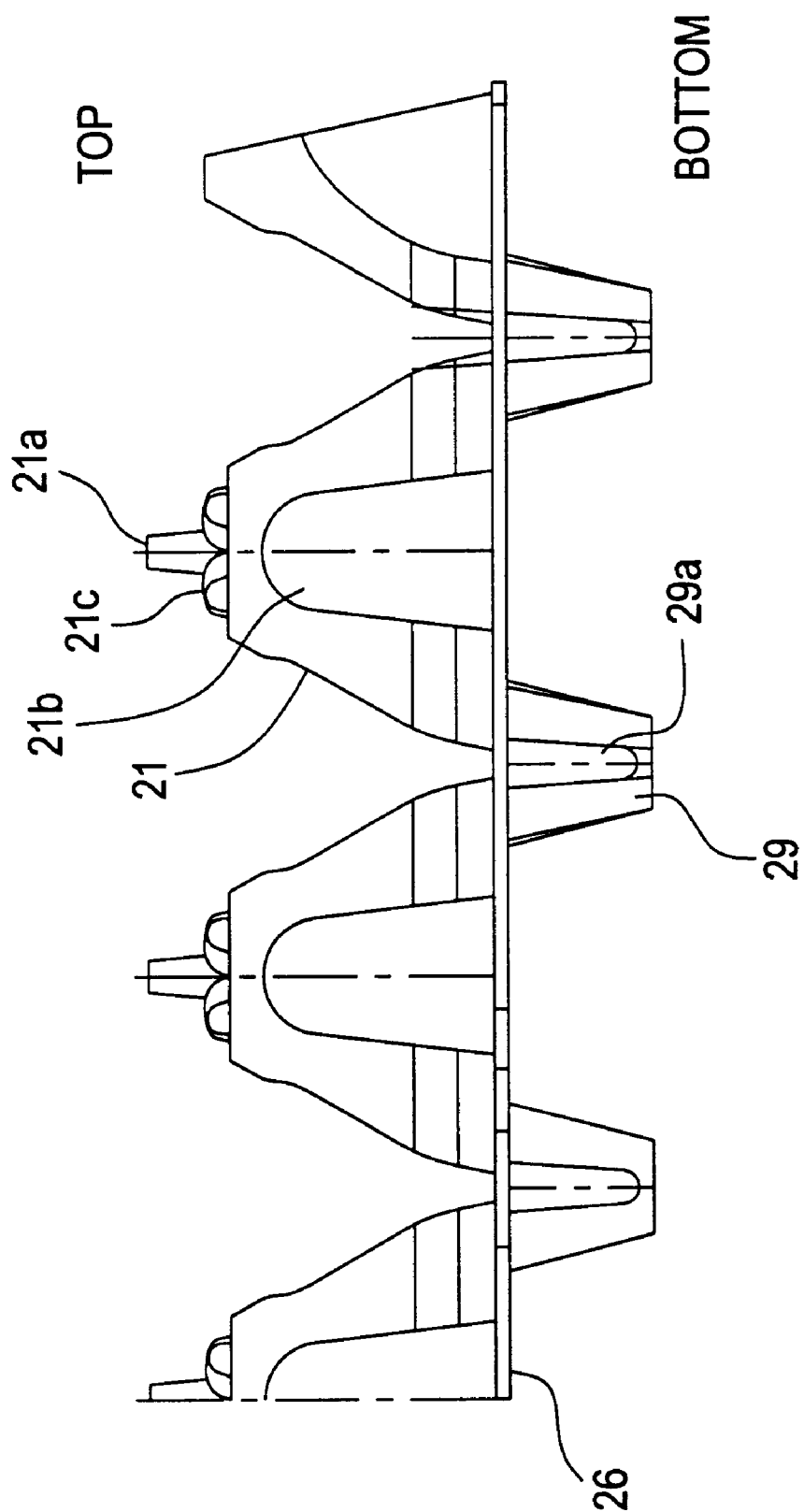
FIG. 14 is a side view of another embodiment of a flat of the present invention.
Figure 15:
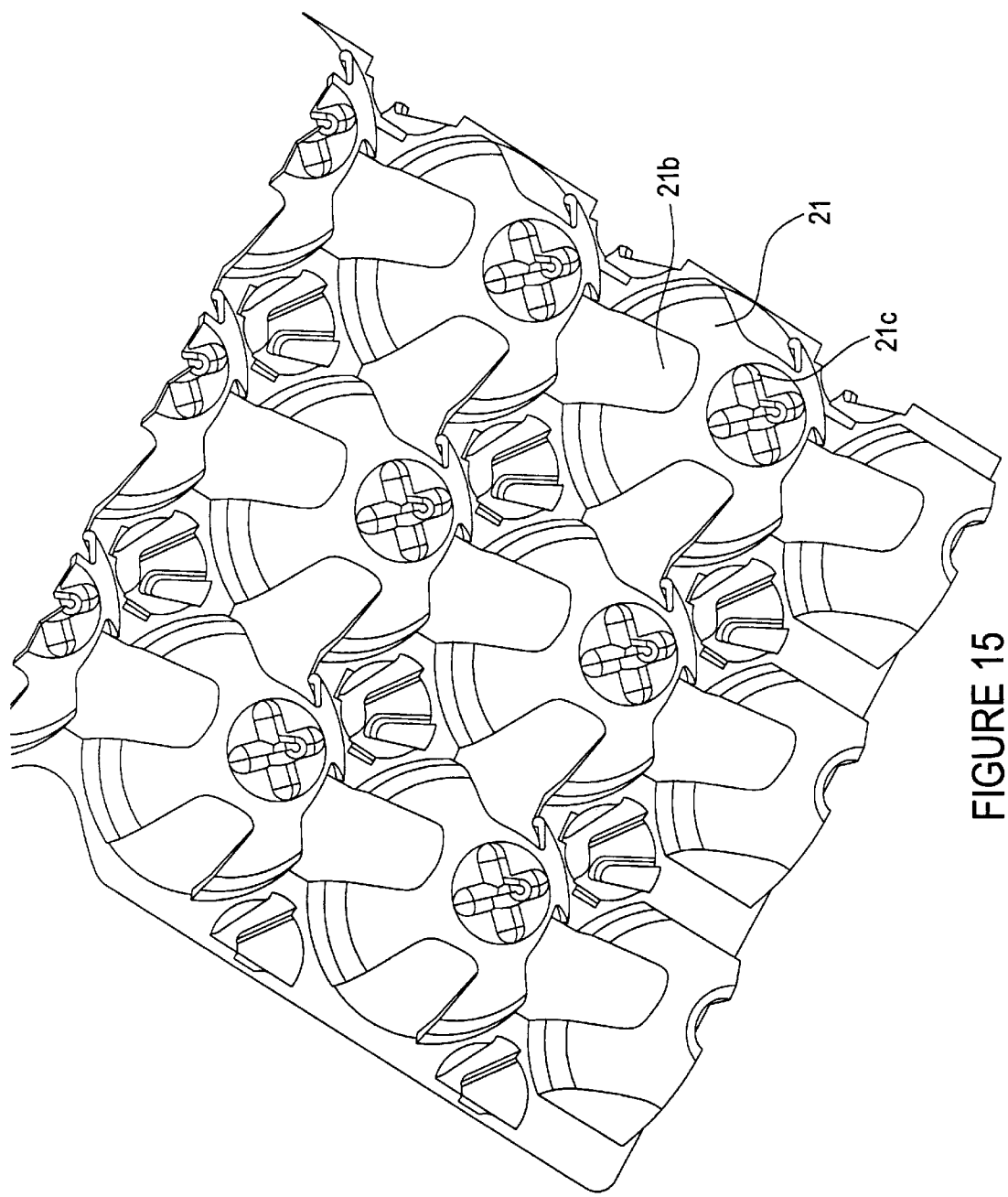
FIG. 15 is a perspective top view of the flat of FIG. 14.
Figure 16:
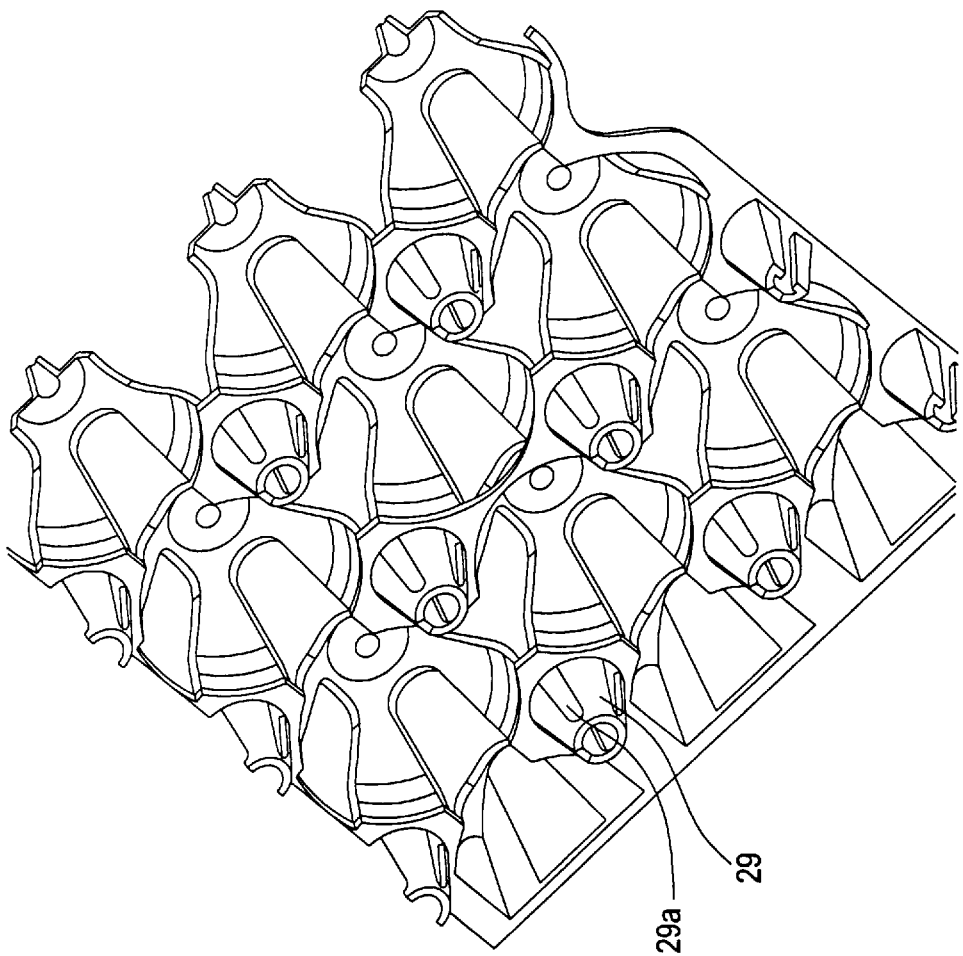
FIG. 16 is a perspective bottom view of the flat of FIG. 14.

FIG. 12 depicts a perspective view from the bottom of the flat of FIGS. 2, 3 and/or 7. FIG. 13 is another perspective view similar to that of FIG. 12. FIG. 14 depicts another cross-sectional view of an embodiment of the flat of the present invention. FIG. 15 is a top perspective view of the flat of FIG. 14. FIG. 16 is perspective bottom view of the flat of FIGS. 14 and/or 15.

The flats form oriented stacks as depicted in FIG. 11 to cooperatively form cavities 19 to loosely hold whole in-shell eggs 5 therein. For example, the cavities are preferably sufficiently large to allow eggs 5 to freely float therein when such egg-filled flats are immersed in fluid 40. Extensions 21a allow a slight-vertical movement of the flats when formed into oriented stacks (e.g., as in FIG. 11) while substantially preventing relative horizontal motion between adjacent flats of the oriented stack. Another feature of the flats is their open structure, e.g., openings 21b and 29a. These openings allow fluid 40 and bubbles of gas 25 (of one or more gases such as air, $CO_2$, etc.) to freely flow around the entire surface of each egg 5 held in layers thereof within the oriented stacks (see FIG. 11). Free flow of fluid 40 and bubbles of gas 25 preferably around the entire surface of each egg permits uniform pre-heating, heating and/or pasteurization of each egg within a stack without substantially impairing egg-functionality. Such openings permit the uniform heating of all eggs within one or more stacked layers thereof whether the stacks are close to or far from the pre-heaters and/or heaters. Preferably, the eggs rest at only four tangent points in the oriented stacks when removed from the bath, preventing them from excessively sticking when using wax. See co-pending patent application Ser. No. 09/001,674.

Figure 17:
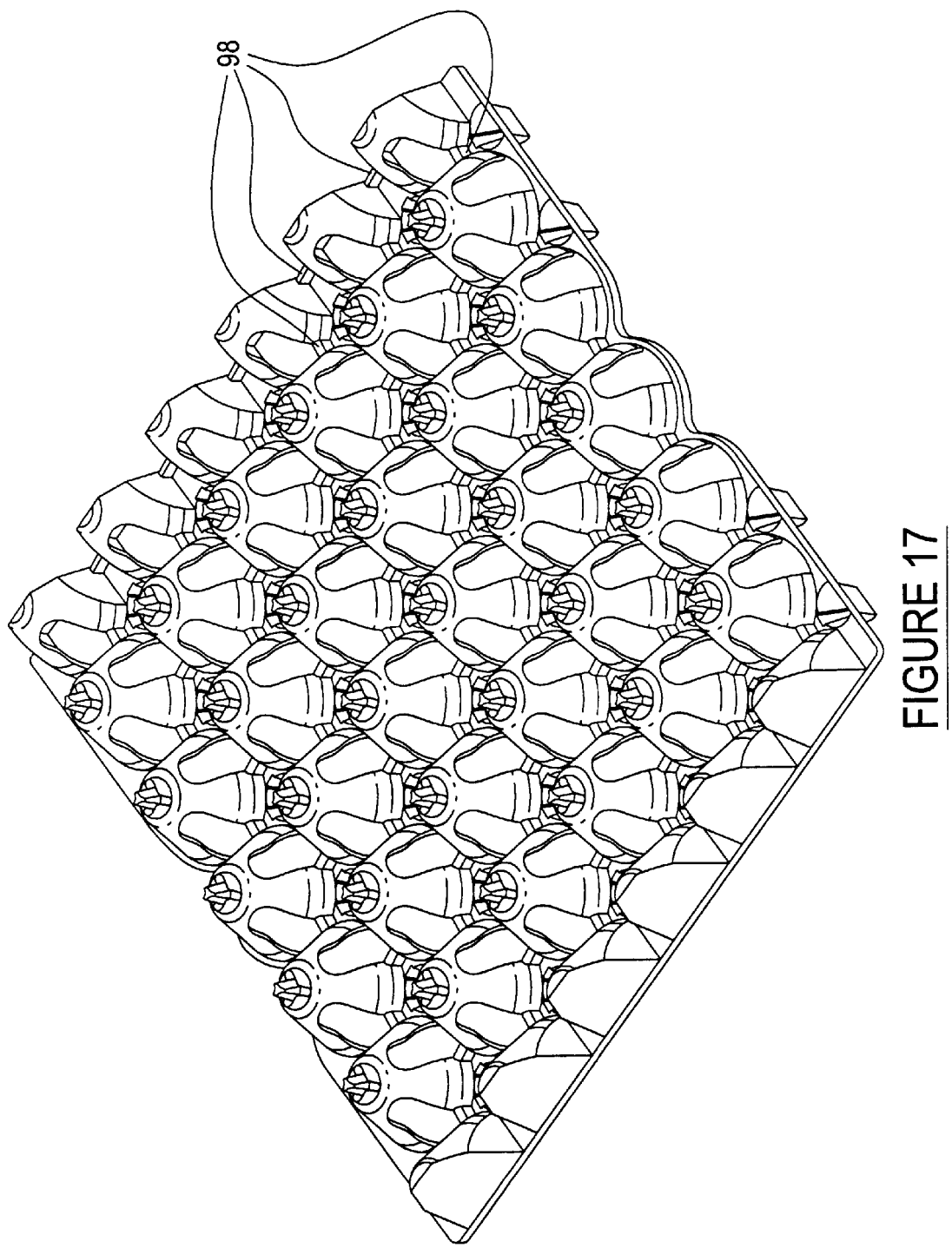
FIG. 17 is a perspective top view of another embodiment of the flat of the present invention.

FIG. 17 depicts a top perspective view of another embodiment of a flat of the present invention. In comparison to the flat of FIG. 5, the flat of FIG. 17 depicts reinforcing bridges 98 intended to substantially keep the flat from bending when filled with eggs. While FIG. 17 depicts a preferred embodiment, other reinforcing methods such as using a stiffer mold material and/or varying the placement of the reinforcing bridges 98 which are sufficient to reinforce the flat without interfering with the operation of the presently claimed invention may be used.

While the configurations of FIGS. 2–17 are depicted, any other suitably open flat structure sufficient to loosely hold eggs in a plurality of stacked layers while permitting flow of heated fluid and bubbles around the entire surface of each egg may be used. Such other flat configuration is within the scope of the present invention.

The flats are preferably made from any reusable or disposable material. However, reusable materials such as rubbers, plastics, fiberglass, other polymers, metals and the like may be used. Of these, plastic and rubber flats are preferred due to their low weight and resilience in heated water.

EXAMPLE I

Overview

The purpose of the Pasteurizer machine is to pasteurize eggs. Carriers full of eggs are preferably moved through three hot baths and one cold bath of water. The temperature of the water is precisely controlled and the time the eggs spend in the baths is controlled as well. After passing through the Pasteurizer, stacks of eggs are unloaded from the carriers, the eggs are separated, dried, candled, labeled, and packaged.

The eggs are received by the Pasteurizer in stacks. The stacks are then loaded into carriers to pass through the Pasteurizing process. All 18 compartments of a carrier should be occupied by a stack for the carrier to enter the machine.

The typical production rate is 175 cases per hour (each case has 30 dozen eggs in it yielding a rate of 5,250 dozen eggs per hour). The rate is adjustable.

Basic Information

Following specifications for this Example I are:
1 dozen eggs=twelve eggs
1 flat=2.5 dozen eggs
6 flats=1 stack
15 dozen eggs=1 stack
2 stacks=1 case
30 dozen eggs=1 case
1 carrier=18 stacks
1 carrier=9 cases
1 carrier=270 dozen eggs
1 carrier=2 rows and 9 columns
1 Stack of Medium Eggs=19.7 to 22.5 lb. (without flats)
1 Stack of Large Eggs=22.5 to 25.3 lb. (without flats)
1 Stack of Extra Large Eggs=25.3 to 28.1 lb. (without flats)
6 Flats=3.5 lb.

Material Handling (Carriers, Stacks and Eggs)

The material handling equipment moves the eggs through the Pasteurizing process.

Gantry Verticals

The Gantry Verticals are one of the first of two parts of the gantry system. The gantry system is used to transport carriers from the Infeed conveyor to Bath #1, from Bath to Bath, and from Bath #4 to the Outfeed Conveyor. Hooks are used to engage the carriers. There are five Gantry Verticals. Their purpose is to pickup and deposit carriers. The pickup and deposit locations are determined by the position of the Gantry Horizontal, and include pickup from the Infeed Conveyor, pickup and deposit in the four baths, and deposit on the Outfeed Conveyor.

All five Gantry Verticals are identical. Therefore, the following description applies to each of them. They are driven by a 1 hp ac motor with an electric brake. The motor is controlled by a Magnetek GPD333 VFD (variable frequency drive). There are 5 proximity sensors to detect position. They are: Top Stop, Top Approach, Clear Bath, Bottom Approach, and Bottom Stop. Two speeds are used on the VFD's, fast and slow.

The Stop sensors determine the final respective stop points. The Approach sensors cause the VFD to reduce motor speed to slow until the respective stop sensor is reached. The Clear Bath sensor is a stop position where the Gantry Hooks are just above the end walls of the Baths. There are two overtravel switches, one at each end, that will directly stop motion. There is an Up overtravel switch and a Down overtravel switch that will directly stop motion.

Gantry Horizontal

The Gantry Horizontal is the second of two parts of the Gantry System. This Gantry System is used to transport carriers from the Infeed Conveyor to Bath #1, from Bath to Bath, and from Bath #4 to the Outfeed Conveyor. The purpose of the Gantry Horizontal is to move the Gantry Verticals to and from the Infeed and Outfeed Conveyors. All five verticals are attached to and move simultaneously with the Gantry Horizontal.

The Gantry Horizontal is driven by a 2 hp ac motor. The motor is controlled by a Magnetek GPD515 VFD (variable frequency drive). There are four defined positions to which the Gantry Horizontal will travel. Control of those positions will be achieved via a GE Axis Positioning Module installed in the new programmable logic controller (PLC) processor base.

There are two proximity sensors. Both are used during Initialization only. One is used for home position detection, which is at the Pickup Unhook position. The other is at the Deposit Unhook position. It is used to guarantee that there are no carriers hooked if any Gantry Verticals are down at the start of the Initialization. There are two overtravel switches, one at each end, that will directly stop motion.

Bath Belts

There is a belt in each bath into which the carriers engage when inserted into the baths. This is the Bath Belt. The belt is a timing-type of belt with teeth inward and outward. The inward teeth engage the sprockets, and the outward teeth engage the carriers. The carriers have brackets which reside on the top of the Bath Belts, and the brackets have a machined section attached, facing downward. Therefore, when the carriers are inserted into the baths by the gantry vertical assembly, the teeth on the carrier bracket belt engage the outward teeth of the Bath Belt. The belts travel continuously, so there is not a home position.

There are two proximity sensors in each bath. They detect a carrier in the Pickup position, which is the last position in each bath. There is a sensor along the right and along the left wall of the tanks. The pickup position is a "roll-off" position, therefore the Bath Belt no longer has control of the carrier once the carrier is in this position.

The Bath Belt in Bath #1 is bi-directional. That is, it indexes both forward and reverse. All other baths are unidirectional, forward only. The reason for the Bath Belt in Bath #1 being bi-directional is to have the carrier backup from position #2, where it is deposited, to position #1. The carrier will be moved there as quickly as possible after being deposited because Position #1 contains the electric preheaters for the upper row of egg stacks in the carrier. All other motions of Bath Belt #1 are forward.

The Bath Belts in Baths 1, 2, & 3 are driven by ¾ hp ac motors. The Bath Belt in Bath 4 is ¼ hp motor. The motor driving Bath #1 Belt is controlled by a GPD515 VFD. The motors for Bath 2, 3, & 4 are controlled by Magnetek GPD333 VFD's. There are many different increments of motion which the belts must index. Therefore, length of travel values are transferred to the GE Axis Positioning Modules that control motion. There is an Axis Positioning Module per Bath Belt. Defined increments of motion are described in section 2.2.

Heating

The gas-fired hot water boilers consist of two banks of up to five boilers each. They provide heat for the egg pasteurizing process. Each bank of hot water boilers supplies one of two Hot Water Loops, which supply heat to all of the Exchange Tanks.

In addition, each bank of boilers supplies one of two Hot Fill Water Loops which provide an initial fill for baths #1–3, all of the exchange tanks, and an incremental fill (level control) of the exchange tanks (not baths).

Hot Water Loops

The boilers are configured into odd and even numbered boiler banks of up to five each. The odd numbered boiler bank supplies hot water via the #1 Hot Water Loop for one side of the Pasteurizer machine, while the even numbered boiler bank supplies hot water via the #2 Hot Water Loop for the other side of the Pasteurizer machine. Each of the two hot water loops are comprised of a bank of boilers, piping, circulation pump controlled by the PLC, and a temperature probe which is monitored from the Temperature Control System. The Boilers for a given loop are turned on and off in order to maintain the set temperature bandwidth of the water in that loop. The circulation pumps run continuously when the Heat subsystem is on.

The two Hot Water Loops supply hot water to all of the exchange tanks via dedicated exchange tank circulation pumps. The pumps pump the hot water from the Hot Water Loops through heat exchangers in the Exchange Tanks. They do so by pulling water from the supply side of the Hot Water Loop and then returning it to the return side of the Hot Water Loop. The circulation pumps are controlled by the Temperature Control System to maintain Exchange Tank temperatures. Check valves prevent Hot Water Loop flow through the heat exchangers when the Exchange Tank Circulating pumps are off.

Exchange Tank #1 has three dedicated circulation pumps on each side of the machine. One set of three pumps will pump hot water from one Hot Water Loop to heat one side of the Exchange Tank. The other set of three pumps will pump hot water from the other Hot Water Loop to heat the other side of the Exchange Tank. Each group of three is driven by a single output from the Temperature Control System.

Exchange Tanks #2 and #3 work in similar fashion to Exchange Tank #1, except that they have one circulation pump on each side of the machine. Additionally, the cooling system can supply warm water from the Warm Water Loop to exchange tanks #2–3 via dedicated exchange tank circulation pumps. The Hot Water Loop and the Warm Water Loop are never used at the same time to supply heat. The PLC will tell the Temperature Control System which of the two heat sources (hot or warm) to use. The decision is based on the bath temperature setpoints versus the Maximum Heat Capability of the Chiller, which produces the warm water. The Warm Water Loop has priority.

Intermediate Water Loops

The purpose of the Intermediate Loops is to provide a continuous supply of water for the circulation pumps that control the temperatures of the baths. In an Intermediate Loop, water is pulled from an exchange tank by a Pump and then returned to the same exchange tank. The water in each of the exchange tanks is used for two Intermediate Loops by two Hot Pumps, one on each side of the bath which is associated with that Exchange Tank.

There is one (1) intermediate circulation pump for each side of each bath, for a total of six Hot Pumps. The Hot Pumps are controlled by the PLC, and run continuously when the Heat subsystem is on. For all heated baths (1, 2, & 3) there are eleven (11) dedicated bath circulation pumps for each side of each bath, for a total of sixty-six bath circulation pumps. All of the bath circulation pumps are individually controlled by the Temperature Control System to control zone temperatures.

Hot Fill Water

In addition, the boilers supply two sources of Hot Fill Water which provide water for an initial fill of baths #1–3 and all of the exchange tanks. The odd numbered boiler bank heats the Hot Fill Water for filling of baths #1–2 of the Pasteurizer machine. The even numbered boiler bank heats the Hot Fill Water for filling of Bath #3 as well as all of the Exchange Tanks and to supply the Hot Fill Water for keeping up the level of the Exchange Tanks of the Pasteurizer machine.

Cooling System

The hybrid cooling system is comprised of an Affinity water cooled liquid Chiller, AMCOT evaporative Cooling Tower, and seven (7) on-off valves to route the cooling and heating capability of Cooling System to where it is needed based on the requirements for each of the baths.

The cooling system supplies one evaporator and two condensers for heating and cooling in the Pasteurizer machine, a Chiller Warm Water Condenser, a Tower Condenser, and a Cold Water Evaporator.

The cooling system consists of (3) modes of operation:

(1) Mode 1 of the cooling system utilizes one condenser of the Chiller to provide a Chiller Warm Water Loop as an alternative way to heat the Exchange Tank(s) #2 and/or #3. The Cold Water Loop cools bath #4. The Tower Loop helps cool the Chiller, if the Warm Water Loop exceeds the Warm Water Loop setpoint.

(2) Mode 2 of the cooling system utilizes the Cooling Tower to cool the Chiller through the Tower Condenser Loop. The Cold Water Loop cools bath #4.

(3) Mode 3 of the cooling system utilizes the Cooling Tower to directly cool bath #4 and the Chiller is off.

Upon the startup of the egg Pasteurizer machine, the cooling system starts in mode 2. In the startup of mode 2, the water source for the cooling tower shall come from the Drain-Back Tank until it is empty. Any additional water needed by the cooling tower to provide water to cool the Chiller condenser will come from the domestic source.

If the difference between the cooling tower temperature and the temperature of bath #4 (cooling tower temp. minus bath #4 temp.) is greater than or equal to predefined difference, the cooling system switches to mode 3.

If the temperature set-point of either Bath 2 or 3 is less then the Hot Water Loop set-point by 6.5° or more, then the Cooling system will operate in Mode 1. The Hot Water Loop set-point (sent to the Chiller via WinChill software) is equal to the Maximum Capable Chiller Condenser Temperature (configuration setting 21). The bath(s) meeting the criteria for Mode 1 will use the Chiller Hot Water Loop as the source of heat for its Exchange tank. If a bath does not meet the 6.5° temperature differential, then it will use the Hot Water Loop from the boilers as the source of heat for its Exchange tank.

The cooling system supplies cold water to the Cold Water Loop. The Cold Water Loop is a continuous supply of water for a bank of bath circulation pumps which directly control the temperature of cooling Bath #4. There are ten zones, therefore ten bath circulation pumps that pull water from the Cold Water Loop and then return it there. The circulation pumps are controlled by the Temperature Control System (#8–9).

Temperature

The temperature control system consists of ten controllers. Each controller has eleven zones and one master control relay. Each zone has associated with it a set temperature, two temperature sensors (they are averaged), an output for control, and a mode of operation. The modes are On, Off, Temperature Control, and Level Control (which is not used). The purpose of the temperature control system is to control the temperature of the four baths and the three exchange tanks, plus read The temperature of the Hot Water Loops, Warm Water Loop, Cold Water Loop and Cooling Tower Return.

Baths 1, 2, 3, 4

In Bath #1, the first four heat zones and the electric heaters each have a double, or redundant, set of probes. One set of probes goes to controller 2, 3, or 10. The other set goes to controller 1. Since there are redundant probes and controllers, no individual controller failure will cause the loss of control of one of these zones. The computers will monitor the controllers and if a failure occurs, switch the Controller controlling those zones to another Controller (only one Controller at a time will control those zones). There are not redundant circulating pumps or electric heaters. The Temperature control over the remaining heat zones in Bath #1, and in all of Baths #2 and #3, is laid out with two controllers.

There are two temperature probes per zone. One is located near the bottom and the other located some distance above the heat exchanger coil. There are a total of 132 temperature probes which interface to the Temperature Control System in order to provide control of the dedicated bath circulation pumps for Baths 1, 2, and 3.

In Bath #4, there are also two temperature probes per zone, with the same orientation as the heated baths. Since there are 10 bath zones, there are 20 probes which interface to the Temperature Control System in order to provide control of the dedicated bath circulation pumps for Bath #4.

Exchange Tanks 1, 2, 3

In Exchange Tank #1, there are two zones, with two probes and one circulating pump per zone. The zones are controlled by different Controllers. One zone controls the temperature on one side of the tank, with the heat source being Hot Water Loop #1. The other zone controls the temperature on the other side of the tank, with the heat source being Hot Water Loop #2.

In Exchange Tank #2, there are four zones, with two probes and one circulating pump per zone. Two of the zones (one per side) use the Hot Water Loop as the heat source. These two zones are controlled by different Controllers. The other two zones (one per side) use the Warm Water Loop as the heat source. These are controlled by different Controllers.

In Exchange Tank #3, there are four zones, with two probes and one circulating pump per zone. Two of the zones, (one per side) use the Hot Water Loop as the heat source. These two zones are controlled by different Controllers. The other two zones (one per side) use the Warm Water Loop as the heat source. These are controlled by different Controllers.

Sparging System

Sparging is defined as introducing air into a liquid. A fifteen horsepower regenerative blower provides air for the bubbles of the sparger system. Wiring for a second blower is in the control system. The sparging system requires testing in the actual installation to determine the need for the second blower.

The sparger system is necessary for the process. A second blower option gives some or complete functional redundancy. A pressure switch on the sparging system allows the control system to switch to the backup blower in case the primary blower fails. This will only be effective if a second blower is provided by the customer. If air pressure cannot be maintained, the system will stop processing new eggs and determine if any eggs in process are not pasteurized properly.

Control System

There are two computers. The computer located at the control cabinets will be referred to as the Main Computer. The computer located at the Load Station will be referred to as the Loader Computer. The purpose of the computers will be supervisory control and operator interface (Human Machine Interface—HMI). They will have identical functionality and serve as backups to each other. Levels of security will be provided.

The actual control of the Pasteurizing machine will be accomplished via a GE Fanuc Model 90/30 PLC.

There are three control cabinets. The Pasteurizer cabinet, the Loader/Unloader cabinet and the Boiler/Chiller cabinet. There are also two computer cabinets to hold the two computers mentioned above.

Descriptions of Operation

Cooling System

The hybrid cooling system is comprised of an Affinity water cooled liquid Chiller, AMCOT evaporative Cooling Tower, and seven on-off valves to route the cooling and heating capability of Cooling System to where it is needed based on the requirements for each of the affected baths.

The Chiller has one evaporator and two condensers for cooling and heating in the Pasteurizer machine. The three heat exchangers consist of a Warm Water Condenser, a Tower Condenser, and a Cold Water Evaporator.

The cooling system consists of three modes of operation:

(1) Mode 1 of the cooling system utilizes one condenser of the Chiller to provide heat to a Warm Water Loop as an alternative way to heat the Exchange Tank(s) #2 and/or #3. The evaporator provides cooling to a Cold Water Loop which is used to cool bath #4. The cooling tower provides auxiliary cooling to the Tower Condenser as needed. This is expected to be the "normal" mode of operation on machine #1 unless it is very cold outside.

(2) Mode 2 of the cooling system utilizes the Cooling Tower to cool the Chiller through the Tower Condenser Loop. The Cold Water Evaporator "Loop" cools bath #4. This is expected to be the normal mode of operation on systems with a six position bath #4 and extra large Chillers.

(3) Mode 3 of the cooling system utilizes the Cooling Tower to directly cool bath #4 and the Chiller is off. This is expected to be the normal mode of operation when it is cold outside and the Cooling Tower can directly cool bath #4.

Upon the startup of the egg Pasteurizer machine in the Auto Production, the cooling system starts in mode 2. This mode will work under any circumstances and it gives the control system a chance to ascertain the temperature that the Cooling Tower will achieve.

EXAMPLE II

Operation

Initially, the eggs are received in stacks of fifteen dozen eggs. Each stack consists of six perforated plastic trays of two and one-half dozen eggs each. Eighteen stacks of eggs are placed into carriers in two rows (one above the other) of nine stacks each. Each stack is held in place on the carrier while it travels through the bath(s) of the Pasteurizer.

When the operator inputs the size and temperature of the eggs to be pasteurized, the computer system will "look up" the temperatures of each bath, the time between each motion and the length of motion of the indexing belts on a per bath basis. The supervisory computer will then control all of the temperature control elements and motion control elements throughout the entire system in accordance with those parameters.

When the temperatures have been reached and the system is ready the first of a five-place up/down material handling system (MHS) picks up the loaded egg carrier to the top of its motion. Then the horizontal actuator moves the up/down system with the egg carrier forward in step with the other up/down MHS until the egg carrier is over the second position in the first bath. The up/down system lowers the egg carrier into the bath. An indexing belt within the first bath moves the egg carrier (under the wax described later) back to the first position in the first bath.

All of the up/down MHS's move back to initial positions. The first of the five-place up/down MHS loads the egg carriers from the carrier loader/unloader conveyor into the first bath. Each of the three subsequent up/down mechanisms lifts the egg carriers from one bath into the next bath. The last up/down mechanism lifts the Pasteurized and cooled eggs (in their carrier) from the last (chilling) bath and loads it onto the carrier unloading conveyor.

In the first bath, after the specified time, the first carrier is moved by the indexing belt to the third position or third position plus (movements in the forward direction will be one to one plus positions as determined initially when the supervisory computer looks up the pasteurizing formula for the egg size and temperature that is entered before processing begins) in the first bath as another egg carrier is initially loaded by the first up/down material handling system into the second position in the first bath. This process continues until a carrier reaches the last position in the first bath.

The motion of the indexing belt in the first bath after a new carrier is loaded is to first move back one position and then forward two positions (plus). When the leading carrier in the first bath reaches the unloading (last) position, it is retained there so when the indexing belt moves back one position the carrier is still in position to be picked up by the second up/down system.

The second up/down mechanism lifts the last carrier in the first bath up (in unison with all the up/down systems) and then the horizontal actuator moves in step with all the other forward motions. The second up/down mechanism lowers the egg carrier into the first position in the second bath.

Each subsequent bath will have one indexing belt for moving the egg carriers through the bath. They will each be able to move the carriers one to one plus positions per motion.

When egg carriers reach the last position in the second bath the third up/down mechanism moves the carrier up and then in step with all the other forward motions and then down into the third bath.

In similar fashion, the egg carriers are moved through the third bath and up and down into the cooling bath. Then up and down to the unloading system.

A distributed control system with a supervisory computer, controls the temperature of all the baths, the heating and cooling equipment, the material handling equipment, the receiving and exiting interface with the loading and unloading machines. It confirms the temperature of the eggs in the carriers, integrates the pasteurizing rate on a per carrier basis and confirms that the settings made by the operator are substantially correct.

The supervisory computer prints out on a regular timed basis, the temperatures in the baths as a strip chart equivalent with both time and date for archival purposes. Management reports are printed out at the end of each batch of eggs as well as on a daily and monthly basis.

When a carrier has been in the cooling bath for the specified time to achieve the temperature required (41 or 45 degrees F.), the last up/down material handling system will deliver it to the unloading conveyer.

If the unloading or packing machines are not ready to receive the pasteurized eggs, the supervisory computer will start accumulating carriers on the return conveyor until the problem has been solved. The computer control system will not load any more egg carriers until unloading of eggs begins again.

The unloading conveyor moves the egg carrier into line with the return conveyor. A lift mechanism then lifts the egg carrier into alignment with the slide rail of the carrier return conveyor. The transverse mechanism of the return conveyor (which will also accumulates carriers of pasteurized eggs if the unloading of the carriers has to stop for any reason) is positioned over the pasteurized egg carrier. A gripper grips the carrier and the transverse mechanism moves the carrier to the other end of the return conveyor in line with the lift mechanism (lifted to receive the carrier) of the unload/load conveyor. The gripper releases the carrier and the lift mechanism lowers the carrier onto the unload/load conveyor.

Water Baths

The three hot water baths and the cooling bath are each to be six positions plus one foot long plus whatever is needed for wax management and water inlets/outlets etc.

The water baths are 10 feet wide, 90 inches long and 72 inches high.

The water bath sections are made from 304 Stainless Steel.

Each water bath has structural elements that serve many purposes—legs, structural integrity, support of egg carrier track, attachment points for indexing belts, and horizontal actuators for up/down mechanisms.

Each water bath section has fittings for heat transfer tubes (or optional electrical heaters), temperature measuring probes and air tubes.

Each water bath has indexing belts for moving the carriers under water through the bath.

Each water bath has tracks for holding the carriers in place as they are indexed through the bath.

Each water bath bottom is shaped to drain in the center. Each bath has its drains connected by plumbing and a drain operator.

Each water bath section is constructed so as to be able to manage a layer of melted wax on its surface. Skimmers, traced tubing and pumps are set up to pump wax through a filter, move the wax to another bath and spent wax to disposal containers.

The third heated bath will also have a second skimmer for re-circulating wax from the last position back to the beginning of the bath. It will also have a removable dam for holding wax back from the last position.

The indexing system in the heated baths will be constructed so they will pass the egg carriers under the wax and the wax dam in the third bath and then allow them to be lifted through space between the dam and the end of the bath where all wax is held back by the dam and skimmed from the surface. The fourth up/down mechanism lifts the carriers through the above mentioned non-wax space and places them into the chiller.

Each water bath section is to have attachment points for cover/walkway. The cover/walkway will cover the piping, valves, electronic temperature controls, wiring troughs and provide a place to stand when observing, testing or cleaning the water baths.

Between water baths a removable drip cover is provided. It is slanted "backwards".

Egg Carrier

The egg carrier is strong enough to hold the 270 dozen eggs while being picked up by the material handling unit. It is compatible with the egg stack loading and unloading devices.

The egg carrier can be set down on a floor.

The egg carrier is substantially open to allow the free flow of wax, water and bubbles to pass through it and the stacks of eggs.

The egg carrier weighs about 300 pounds and overcomes the buoyancy of the perforated plastic trays so it will not float out of its track as it moves through the water baths.

The egg carrier captures the stacks of eggs (they have a tendency to float due to the buoyancy of the perforated plastic flats) and releases them up when loading or unloading.

Heating

Eight modular hot water 300,000 BTU "boilers" are ganged together to provide heating capacity for initial heating and redundancy for pasteurizing.

Three hot water storage tanks with internal heat transfer tubing are required. The temperature of each one is controlled by the Temperature Control System. The size of each insulated tank is about 300 gallons.

"Crushed" two-inch diameter stainless steel tube heat transfer coils near the bottom of the water baths will transfer the heat or "cold" into the baths.

Circulating pumps will pump water through boilers, storage tanks, and heat transfer coils.

Small/high reliability pumps will turn on and off hot or cold water to heat transfer coils.

Electric heaters are placed at the beginning of the first tank so that when the carrier of eggs is put into the tank and backed into position, it will provide pre-heating to the upper stacks of eggs.

Bubbler

A regenerative blower of sufficient size will provide air for the sparger (bubbler) system. The starting point is a blower whose CFM is equal to the area of the surface of the baths. The pressure generated at that CFM must be at least 90 inches of water column.

The piping must be insulated metal. It must be circular with two inlets 180° apart. The piping has to be above the level of the water/wax at its highest level in the baths. The air should be plumbed with a vertical trap and a small hole at the top of the loop so that water cannot be drawn back to the pump under any circumstances.

Air tubes are to be arranged under all heating and cooling coils. Coverage should be even throughout the baths.

The air tubes are to be plumbed, equally spaced, to the circular metal piping.

Piping

All piping that is not part of a closed sealed system will be stainless steel.

Cooling

Cooling water from a hybrid cooling system is to be circulated through the heat transfer coils in the cooling bath.

The hybrid cooling system consists of a cooling tower (evaporative cooler) and a water-cooled liquid chiller of sufficient capacity to meet final temperature requirements. When the weather allows, the cooling tower will chill the cooling water. When the weather does not permit the cooling tower to do the job, the water-cooled liquid chiller will come on line. The evaporator will chill the cooling water.

The water-cooled liquid chiller will be designed to work with the condenser cooling water as warm as 140° F. Valves will be installed so that the condenser water can be routed away from the cooling tower and through the heating loops of the second and or third insulated water storage tanks at the supervisory computer's instruction. If the demand for heat drops below what the chiller needs to dissipate, the cooling tower will be brought on line to add the needed cooling water to cool the condenser sufficiently. This will yield efficient use of energy while at the same time providing reliable chilling of eggs.

Water Sanitation

A residual gas chlorine system and a monitoring system keep the chlorine level in the cooling water within the specifications of the FDA.

Another gas system (such as ozone) or other materials/methods sanitize the hot baths so non-pathogenic bacteria does not build up requiring frequent dumping of the water baths.

Computer Control System

The computer control system consists of distributed independent Temperature Controls and supervisory computer system.

The temperature controls handle the pasteurizing temperature control. They have a communication system that allows the supervisory control system to set them and get reports from them about the state of the process.

Probes

The temperature measuring probes are RTD type. The first four heater zones (five including the electric heater) will have a double set of probes.

What is claimed is:

1. A process for pasteurizing in-shell eggs, comprising enveloping at least one stack of a plurality of layers of said eggs in at least one heated fluid until said eggs are pasteurized by transferring heat from said fluid to said eggs without substantially impairing functionality of said eggs.

2. The process of claim 1, wherein said stack is transported through said at least one heated fluid.

3. The process of claim 1, wherein said stack comprises at least three said layers.

4. The process of claim 1, wherein said stack comprises at least 2 said layers.

5. The process of claim 1, wherein said stack comprises at least 6 said layers.

6. The process of claim 1, wherein each said layer comprises a plurality of said eggs.

7. The process of claim 1, wherein each said layer comprises at least twenty-four said eggs.

8. The process of claim 1, wherein each said layer comprises at least thirty said eggs.

9. A process for pasteurizing in-shell eggs, comprising:
   immersing and holding at least one stack of a plurality of layers of said eggs in a first heated fluid until said eggs are substantially uniformly pre-heated throughout said at least one stack; and
   enveloping said at least one stack in a second heated fluid until said eggs are pasteurized by absorbing heat from said fluid, all without substantially impairing functionality of said eggs.

10. The process of claim 9, further comprising transporting said at least one stack through said second heated fluid until said eggs are pasteurized.

11. The process of claim 9, wherein said immersing and holding step comprises:
preheating said eggs by at least one first pre-heater disposed below said stack and at least one second pre-heater spaced in a vertical direction from said first pre-heater and interposed between at least two said layers of eggs of said stack.

12. The process of claim 11, wherein said second heated fluid is maintained at a substantially uniform temperature.

13. The process of claim 10, wherein said immersing and holding step comprises:
separately immersing and holding at least a first said stack and at least a second said stack in said first heated fluid, each of said first and second stacks having no more than six of said layers of eggs, until said eggs are substantially uniformly preheated throughout each of said first and second stacks; and
stacking together said first and second stacks to form a combined stack; and
wherein said transporting step comprises transporting said combined stack.

14. The process of claim 9, wherein said immersing and holding step comprises:
separately immersing and holding at least a first said stack and at least a second said stack in said first heated fluid, each of said first and second stacks having no more than six of said layers of eggs, until said eggs are substantially uniformly preheated throughout each of said first and second stacks; and
stacking together said first and second stacks to form a combined stack; and
wherein said enveloping step comprises enveloping said combined stack.

15. The process of claim 11, wherein said at least one second pre-heater is vertically spaced apart by no more than six said layers of eggs from said at least one first pre-heater.

16. The process of claim 9, wherein said first heated fluid and said second heated fluid are a heated liquid in at least one bath.

17. The process of claim 16, wherein said immersing and holding step comprises immersing said at least one stack in a receiving zone and substantially uniformly pre-heating said eggs throughout said at least one stack in a pre-heating zone; and
wherein said enveloping step comprises removing any stacks of eggs from an exit zone; moving any stacks of eggs in a heating zone toward said exit zone; and moving said pre-heated stack of eggs from said pre-heating zone to said heating zone.

18. The process of claim 17, wherein said at least one stack immersed in said receiving zone is transferred one step back to said pre-heating zone and then two steps forward from said pre-heating zone to said heating zone.

19. The process of claim 18, wherein said immersing and holding step comprises:
preheating said eggs by at least one first pre-heater disposed below said stack and at least one second pre-heater spaced in a vertical direction from said first pre-heater and interposed between at least two said layers of eggs of said stack.

20. The process of claim 9, further comprising vertically perturbating said first heated fluid, said second heated fluid or both of said first heated fluid and said second heated fluid sufficient to render substantially uniform a temperature of said first heated fluid, said second heated fluid or both of said first heated fluid and said second heated fluid.

21. The process of claim 20, wherein said fluid is a liquid, and said vertically perturbating step comprises passing bubbles of at least one gas through at least one of said first heated fluid and said second heated fluid.

22. The process of claim 21, wherein said stack comprises at least two flats, each flat holding at least one of said layers of said eggs.

23. The process of claim 22, wherein upon stacking at least two of said flats, said stacked flats form at least one cavity for loosely holding said eggs in said egg layers.

24. The process of claim 23, wherein said stacked flats form a plurality of open cavities configured to allow said bubbles to propagate through said cavities, through said egg layers and along the entire surfaces of said eggs in said cavities, and wherein each cavity is configured to loosely hold one egg.

25. The process of claim 9, wherein a Haugh value of said eggs remains no less than about 60 Haugh units.

26. The process of claim 25, wherein said at least one stack comprises from about 4 to about 15 of said layers of eggs.

27. The process of claim 26, wherein said layers of eggs each comprise from about 24 to about 48 eggs.

28. The process of claim 9, wherein said eggs are pasteurized to at least a 3 log reduction of Salmonella.

29. The process of claim 9, wherein said immersing and holding step comprises rapidly immersing said at least one stack in its entirety into said first heated fluid.

30. A flat for holding a layer of eggs, comprising:
a plurality of raised contours projecting from a horizontal plane, said contours having a top and said contours being discontinuous to provide openings in said contours;
a plurality of lower contours projecting from said horizontal plane spaced for accepting said plurality of raised contours from a vertically adjacent flat, whereby adjacent upper and lower contours of adjacent flats together form at least one cavity for loosely holding at least one egg;
wherein said cavity is sufficiently open to allow bubbles to propagate through said cavity and along the entire surface of said at least one egg in said cavity when a pair of vertically adjacent said flats loosely holding at least one egg is immersed in a liquid bath; and
wherein said cavity is sufficiently closed to prevent said at least one egg from escaping from the cavity.

31. The flat of claim 30, wherein a plurality of said flats cooperatively fit to form a stack containing a plurality of said cavities for holding said layers of said eggs.

32. The flat of claim 30, wherein said cavity is sufficiently open to permit drainage of fluid out of said flat.

33. The flat of claim 30, wherein said cavity is sufficiently open to permit drainage of molten wax out of said flat.

34. The flat of claim 33, wherein contact between a vertically adjacent upper and a vertically adjacent lower flat is insufficient to cause substantial sticking of said vertically adjacent flats due to cooling of said wax when at least said lower flat is substantially filled with a plurality of the in-shell eggs.

35. The flat of claim 34, wherein contact between said in-shell eggs and said upper and said lower flats is insufficient to cause substantial sticking of said eggs to said upper and said lower flats.

36. An apparatus for pasteurizing in-shell eggs, comprising:

means for immersing and holding at least one stack of a plurality of layers of said eggs in heated fluid until said eggs are substantially uniformly preheated throughout said at least one stack; and means for transporting said at least one stack through heated fluid until said eggs are pasteurized by absorbing heat from said fluid, all without substantially impairing functionality of said eggs.

37. The apparatus of claim 36, wherein said means for transporting comprises means for enveloping said at least one stack in heated fluid until said eggs are pasteurized.

38. An apparatus for pasteurizing in-shell eggs, comprising:

at least one bath for holding a heated fluid, said at least one bath having a receiving zone, a pre-heating zone, a heating zone, and an exit zone;

a loader configured to load at least one stack of a plurality of layers of said eggs into said receiving zone;

at least one conveyor configured to move said at least one stack from said receiving zone to said pre-heating zone, to move any eggs in said heating zone towards said exit zone, and to move pre-heated eggs from said pre-heating zone to said heating zone; and an unloader configured to remove eggs from said exit zone.

39. The apparatus of claim 38, wherein said pre-heating zone comprises at least one first pre-heater positioned below said at least one stack and at least one additional pre-heater spaced vertically along said at least one stack, said first and additional pre-heaters being adapted to substantially uniformly preheat said eggs in said at least one stack.

40. The apparatus of claim 38, further comprising a source of bubbles for vertically perturbating said fluid in at least one said bath.

41. The apparatus of claim 38, wherein said receiving zone, said pre-heating zone, said heating zone, and said exit zone are provided in a plurality of separate baths.

* * * * *